(12) United States Patent
Hattori et al.

(10) Patent No.: US 6,437,844 B1
(45) Date of Patent: Aug. 20, 2002

(54) LIQUID CRYSTAL DISPLAY DEVICE AND ASSOCIATED FABRICATION METHOD

(75) Inventors: Katsuji Hattori, Takarazuka; Shoichi Ishihara; Hiroshi Yamazoe, both of Katano, all of (JP)

(73) Assignee: Matsushita Electric Industrial Co., Ltd. (JP)

(*) Notice: Subject to any disclaimer, the term of this patent is extended or adjusted under 35 U.S.C. 154(b) by 0 days.

(21) Appl. No.: 08/922,021

(22) Filed: Sep. 2, 1997

(30) Foreign Application Priority Data

| Sep. 4, 1996 | (JP) | 8-234020 |
| Sep. 27, 1996 | (JP) | 8-256103 |
| Jan. 24, 1997 | (JP) | 9-010887 |
| Apr. 21, 1997 | (JP) | 9-102960 |
| Apr. 22, 1997 | (JP) | 9-104346 |
| Jul. 23, 1997 | (JP) | 9-196684 |

(51) Int. Cl.$^7$ .................. G02F 1/1337; G02F 1/1335
(52) U.S. Cl. ..................... 349/129; 349/117
(58) Field of Search .................. 349/117, 118, 349/129, 123, 191, 75

(56) References Cited

U.S. PATENT DOCUMENTS

| 4,566,758 A | 1/1986 | Bos .................. 350/346 |
| 4,582,396 A | 4/1986 | Bos et al. ............ 350/347 |
| 5,194,975 A * | 3/1993 | Akatsuka et al. ..... 349/117 |
| 5,410,422 A | 4/1995 | Bos .................... 359/73 |
| 5,446,569 A * | 8/1995 | Iwai et al. .......... 349/117 |
| 5,541,753 A | 7/1996 | Raynes et al. ........ 359/94 |
| 5,550,662 A | 8/1996 | Bos .................... 359/73 |
| 5,745,206 A * | 4/1998 | Koike et al. ........ 349/129 |
| 5,825,445 A * | 10/1998 | Okamoto et al. ..... 349/118 |

FOREIGN PATENT DOCUMENTS

| EP | 0 781 826 A | * | 2/1997 |
| JP | 59-219720 | | 12/1984 |
| JP | 61-116329 | | 6/1986 |
| JP | 7-49509 | | 2/1995 |
| JP | 7-84254 | | 3/1995 |
| JP | 9-96790 | | 4/1997 |
| JP | 9-105957 | | 4/1997 |

* cited by examiner

Primary Examiner—William L. Sikes
Assistant Examiner—Dung Nguyen
(74) Attorney, Agent, or Firm—Parkhurst & Wendel, L.L.P.

(57) ABSTRACT

A liquid crystal display device having a pixel electrode, a counter electrode, and a liquid crystal between the electrodes. Liquid crystal molecules in contact or near the respective opposed surfaces of the electrodes have specified pretilt angles as a result of the conditioning of those surfaces. When no voltage is applied, the liquid crystal is in a splay alignment state; applying voltage prior to image display causes a transition of transformation of the splay alignment state to a bend alignment state; image display is carried out under the bend alignment state. Transition from the splay alignment state to the bend alignment state is promoted by having a large pretilt angle domain formed on at least one of the electrode surfaces causing a larger pretilt angle of liquid crystal molecules than is present in a region surrounding the large pretilt angle domain.

8 Claims, 32 Drawing Sheets

LIQUID CRYSTAL DISPLAY DEVICE AND ASSOCIATED FABRICATION METHOD

BACKGROUND OF THE INVENTION (1) Field of the Invention

The invention relates to liquid crystal display devices well suited for use in computer displays, television receivers and other industrial products and to methods for fabricating them. More particularly, the invention pertains to light-transmissive type and light-reflective type liquid crystal display devices capable of providing rapid response and a wide range of viewing angles and to fabrication methods thereof.

(2) Description of the Related Art

There have been practically used twisted-nematic (TN) liquid crystal display devices incorporating a nematic liquid crystal. The TN mode, however, has the drawback of poor response. Another disadvantage of the TN mode is that viewing angles, that is, angles through which the viewer can see images properly are narrow. Concretely, when diagonally viewing images in a TN liquid crystal display device, brightness and contrast decrease and gray scale inversion occurs. For this reason, such TN mode is unacceptable for liquid crystal display systems that operate at high speed to provide animatic images or require good angular viewability when viewed in diagonal directions. Another known type of liquid crystal display devices is the Polymer Dispersed Liquid Crystal (PDLC) mode that utilizes the effect of light dispersion. This mode advantageously provides high brightness, because it does not require use of a polarizing plate. However, the response speed of the PDLC mode is as low as that of TN liquid crystal display devices. Additionally, the PDLC mode provides a wide range of viewing angles but the viewing angles of the PDLC mode cannot be controlled in principle by a phase compensating layer like the TN mode. There have been developed other types of liquid crystal display devices: Ferroelectric Liquid Crystal (FLC) and Anti-Ferroelectric Liquid Crystal (ALFC). These modes suffer from the critical problems of poor shock resistance and temperature characteristics and therefore have not been put to practical use.

In an attempt to overcome the foregoing problems, Optically Compensated Bend (OCB) liquid crystal display devices have been proposed, which exhibit extremely rapid response and a relatively wide range of viewing angles. One example of such devices is disclosed in Japanese Patent Laid-Open Publication No. 7-84254 (1995). One embodiment of the OCB liquid crystal display devices according to this publication is designed as shown in FIG. 1 to have a liquid crystal cell 11 in which a liquid crystal 12 is enclosed between a pair of transparent substrates 13, 14 and in which a pixel electrode 15, a counter electrode 16 and alignment films 17, 18 are formed on the transparent substrates 13, 14. The surfaces of the alignment films 17, 18 are conditioned so as to form a bend alignment state in which liquid crystal molecules 12a, 12b proximate to or contacting the alignment films 17, 18 are symmetrically tilted as shown in FIG. 1. More concretely, the surfaces of the alignment films 17, 18 are rubbed in the same direction to form a pretilt angle ranging from several degrees to 10 degrees. The bend alignment state may include twist in the proximity of the centers of the transparent substrates 13, 14 (i.e., liquid crystal molecules in the proximity of the centers are twisted so that they do not lie in the plane where the X and Z axes lie) depending on design conditions. Provided on both sides of the liquid crystal cell 11 are polarizing plates 19, 20.

Sandwiched between the transparent substrate 14 and the polarizing plate 20 is a phase compensating layer 21 for optically compensating the director alignment of the liquid crystal 12. In the above-described bend alignment state, the liquid crystal molecules change rapidly with a change in the driving voltage applied between the pixel electrode 15 and the counter electrode 16, and consequently, fast response can be achieved. Such fast response due to the rapid molecular change can be obtained even when changing applied voltage between two levels corresponding to two halftones that have a slight difference in brightness. The symmetry of the bend alignment state increases the angular viewability in the plane where the X and Z axes lie so that e.g., a viewing angle of about ±50° can be achieved, whereas the phase compensating layer 21 increases angular viewability in the plane where the Y and Z axes lie so that e.g., a viewing angle of about ±40° can be achieved. Note that, in FIG. 1, the X and Y axes designate the transverse direction and vertical direction, respectively, of the display screen. The phase compensating layer 21 also contributes to a reduction in driving voltage.

The OCB liquid crystal display device presents a difficult problem. That is, the device requires formation of the bend alignment state prior to image displaying, which is unfavorable for the following reason. When no voltage is applied between the pixel electrode 15 and the counter electrode 16, the bend alignment state is not formed but a splay alignment state P with the liquid crystal molecules arranged fanwise is created as shown in FIG. 2, even if the above surface treatment is applied to the alignment films 17, 18. Therefore, at the time such as when a power supply is turned on, the splay alignment state P should be changed to the bend alignment state Q by application of high electric energy. The transition from the splay alignment state P to the bend alignment state Q can be caused at relatively high speeds by applying a comparatively high voltage ranging from e.g., 10 V to 30 V between the pixel electrode 15 and the counter electrode 16. However, it takes more than tens of minutes to cause the transition when applying a voltage (several volts) that is low enough to avoid excessive load on the driving ICs. In the worst case, such transition does not occur until after an elapse of more than one hour. This delay hinders practical use of the OCB liquid crystal display device.

As an attempt to solve the above problem, Japanese Patent Laid-Open Publication No. 9-96790 (1997) proposes a technique in which the twisted alignment of the liquid crystal molecules as seen in the TN mode is combined with the rising alignment (in which the liquid crystal molecules are aligned in a direction normal to the substrates) similar to that of the OCB mode. This technique is intended to solve the above problem by eliminating the need for formation of the bend alignment state and to achieve higher response speed than the TN mode by forming a director alignment similar to the bend alignment state. In reality, however, fast response can not be necessarily achieved even if a director alignment similar to the bend alignment state is formed.

Although the above prior art OCB liquid crystal display device succeeds in providing wide viewing angles to a certain extent, the device still have difficulty in largely increasing the viewing angle within the plane where the Y and Z axes lie (see FIG. 1) by the phase compensating layer 21 alone and therefore the viewing angle characteristics vary significantly according to viewing directions. Accordingly, the OCB liquid crystal display device leaves much to be desired in the viewing angle uniformity. As mentioned earlier, the viewing angle within the plane where the X and Z axes lie (FIG. 1) can be improved by the symmetry of the bend alignment state. In order to further increase the viewing angles not only in this direction but also in other directions, it is conceivable to use a biaxial phase compensating layer as the phase compensating layer 21. However, the fabrication of such a phase compensating layer requires accurate control of the index of refraction in triaxial directions, so that where the OCB liquid crystal display device is applied to a large screen display system, it is extremely difficult to form such a compensating layer that possesses uniform properties throughout the display screen.

In many cases, the polarizing plates 19, 20 are placed as shown in FIG. 3 such that their polarization axes respectively form an angle of 45° or a specified angle relative to the conditioning direction of the alignment films 17, 18. In this case, light incident on the liquid crystal cell 11 passes through the liquid crystal 12 in the birefringence mode. Such propagation tends to cause the viewing angle dependence of the hues of a display image (i.e., hues and color stability may vary according to viewing angles). Hue shifts would be caused not only by certain viewing angles but also by the following factors even when images are viewed squarely (i.e., in a direction perpendicular to the substrates). FIG. 4 shows the transmission rates of blue, green and red light where different voltages are applied between the pixel and counter electrodes of a liquid crystal display device. The liquid crystal display device used herein is produced under the following conditions:

Alignment film: Polyimide director alignment film PSI-A2204 produced by Chisso Corporation.

Liquid crystal: MT-5440 produced by Chisso Corporation.

Phase compensating layer: Biaxial oriented film produced by Nitto Denko Corporation.

Gap distance of a liquid crystal cell: about 5 $\mu$m

Pretilt angle: 5° to 6°

Other conditions:

(1) The upper and lower substrates are bonded such that the rubbing directions of the alignment films are parallel to each other.

(2) Wavelengths at the centers of the spectra of blue, green and red light are approximately 450 nm, 540 nm and 630 nm, respectively.

As shown in FIG. 4, the light transmission of the liquid crystal varies according to the wavelength of transmitted light. More concretely, when a voltage of 2 V is applied between the pixel and counter electrodes, the transmission rates of blue, green, red light are 0.08, 0.045 and 0.025, respectively. Accordingly, entire images on the screen become bluish. Although it is conceivable that hue shifts can be prevented by adjusting the voltage applied between the pixel and counter electrodes according to the color of light, such adjustment leads to an increased scale of the circuit and a higher production cost.

SUMMARY OF THE INVENTION

According to the first aspect of the invention, there is provided a liquid crystal display device comprising (1) a pixel electrode, (2) a counter electrode and (3) a liquid crystal enclosed between the pixel and counter electrodes, wherein the respective opposed surfaces of the pixel and counter electrodes are conditioned such that liquid crystal molecules contacting or in the vicinity of the surfaces have specified pretilt angles, wherein images are displayed by changing light transmission through formation of a bend alignment state of the liquid crystal, and wherein a large pretilt angle domain is formed on at least either one of the surfaces of the pixel and counter electrodes, the large pretilt angle domain causing a larger pretilt angle of liquid crystal molecules than a region surrounding the large pretilt angle domain does.

One of objects of the invention is to quickly and reliably carry out the transition from the splay alignment state to the bend alignment state in a liquid crystal display device which displays images by changing light transmission through formation of the bend alignment state of the liquid crystal.

To accomplish this object, a liquid crystal display device according to the invention includes a large pretilt angle domain which is formed on at least either the surface of the pixel electrode or the surface of the counter electrode and which is conditioned such that the pretilt angle of liquid crystal molecules caused by the large pretilt angle domain is larger than the pretilt angle of molecules caused by the region surrounding the large pretilt angle domain. The liquid crystal molecules proximate to or contacting the large pretilt angle domain are comparatively raised, and therefore become a core for the transition from the splay alignment state to the bend alignment state when voltage is applied between the pixel electrode and the counter electrode. With this core, the transition region grows and expands, which enables the transition to occur reliably throughout the liquid crystal in a short time. In addition, such transition does not consume large amounts of electric energy so that the driver circuit is not subjected to excessive load.

To achieve the inventive effect, that is, the rapid, reliable transition, we tried to clarify the mechanism of the transition of the director alignment state. After a rigorous study, we found that just after application of voltage, the transition was more likely to occur in the vicinity of spacers which were disposed irregularly between the transparent substrates in order to keep a constant gap between the transparent substrates. The reason for this is that the alignment of the liquid crystal molecules proximate to the spacers tends to be irregular under the influence of the configuration of the spacers and other physical properties of their surfaces so that some molecules near the spacers have larger tilt angles than the tilt angle of the molecules far from the spacers. Such molecules trigger an occurrence of the transition from the splay alignment state to the bend alignment state in the neighborhood of the spacers. However, such transition is accidental and therefore does not occur in the neighborhood of every spacer. Moreover, the spacers may shift and are not necessarily positioned on all the pixels. Liquid crystal display devices usually have a multitude of pixels, and if parts of the pixels do not have such transition, sound images cannot be displayed. To solve this problem and achieve the high-speed, reliable transition, we have come to the idea of the provision of the large pretilt angle domain. Such a large pretilt angle domain may be formed, for example, by partially applying an alignment film material, which imparts a large pretilt angle to liquid crystal molecules, to the surface of an electrode, through phase separation or printing. Alternatively, it may be formed by providing a small projection on an electrode.

According to the second aspect of the invention, there is provided a liquid crystal display device comprising (1) a pixel electrode, (2) a counter electrode, (3) a liquid crystal enclosed between the pixel and counter electrodes, and (4) a phase compensating layer, wherein images are displayed by changing light transmission through formation of a bend alignment state of the liquid crystal and wherein the liquid crystal contains a chiral agent.

The above-described transition can be easily induced by adding a chiral agent to the liquid crystal. A combination of the large pretilt angle domain and the chiral additive causes the transition more easily.

According to the third aspect of the invention, there is provided a liquid crystal display device comprising (1) a first substrate having a pixel electrode formed thereon, (2) a second substrate having a counter electrode formed thereon and positioned opposite the first substrate, (3) a liquid crystal enclosed between the first and second substrates, (4) a first polarizer and a second polarizer disposed so as to sandwich the first and second substrates, the polarizing axes of the first and second polarizers crossing at right angles, and (5) a driver circuit for applying driving voltage between the pixel electrode and the counter electrode, wherein the liquid crystal molecules of the liquid crystal have a twist angle ranging from 160° to 200°, and wherein the driver circuit applies driving voltage between the pixel and counter electrodes, the driving voltage being higher than the highest one of voltages that cause the maximal value of light transmission in the driving voltage-transmission characteristic of the liquid crystal display device.

According to the above liquid crystal display device of the invention, the twist angle of the molecules of the liquid crystal is in the range of from 160° to 200°, and a voltage higher than the voltage that causes the extremum (maximal or minimal value) of light transmission in the driving voltage-transmission characteristic of the liquid crystal display device is applied between the pixel electrode and the counter electrode. With this arrangement, response as fast as that achieved by a device which forms the bend alignment state can be achieved without forming an alignment state similar to the bend alignment state. Concretely, since the liquid crystal molecules are kept in a twisted condition in the above device, there is no need to make a discrete phase transition such as the transition from the splay alignment state to the bend alignment state. Additionally, the liquid crystal molecules can be brought into an alignment state similar to the bend alignment state by application of the above-specified voltage. By virtue of this, images can be displayed, for instance, just after turning on the power supply of the liquid crystal display device and excellent response can be ensured.

According to the forth aspect of the invention, there is provided a liquid crystal display device comprising (1) a pixel electrode, (2) a counter electrode and (3) a liquid crystal enclosed between the pixel and counter electrodes, wherein images are displayed by changing light transmission through formation of a bend alignment state of the liquid crystal, and wherein pixels corresponding to the pixel electrode are divided into at least two domains which cause bend director fields having different orientations in the liquid crystal.

To improve viewing angle characteristics, thereby achieving good viewability in various directions in a liquid crystal display device which displays images by changing light transmission through formation of the bend alignment state of liquid crystal molecules, pixels corresponding to the pixel electrode are divided into at least two domains that cause bend director fields having different orientations in the liquid crystal. Such domain division can be accomplished by rubbing a plurality of regions on the alignment films in different directions or alternatively, by directing ultraviolet rays having different polarizing or illuminating directions onto the regions. With this arrangement, the self compensating ability of viewing angles inherent in the bend director alignment is exerted in a plurality of different directions so that good viewability in various directions can be ensured. Further, a phase compensator may be used in conjunction with the above arrangement to improve the viewing angle characteristics.

According to the fifth aspect of the invention, there is provided a liquid crystal display device comprising (1) a twisted liquid crystal cell having a liquid crystal layer sandwiched between a pair of substrates, the liquid crystal layer having liquid crystal molecules twisted between said pair of substrates and (2) a polarizing plate disposed on either the light incoming side or light outgoing side of the liquid crystal cell, wherein said polarizing plate is disposed such that its polarizing axis is substantially parallel to the longitudinal axis of the liquid crystal molecules on the interface of one of said pair of substrates, said substrate being on the light incoming side or light outgoing side, wherein the twist angle of the liquid crystal molecules in said liquid crystal layer is in the range of from 160° to 200° and said liquid crystal layer contains a dye or pigment, which has a voltage-brightness characteristic according to which when the voltage applied to said liquid crystal cell exceeds the Freedericksz threshold voltage of the liquid crystal, brightness first rises gently with a first gradient and then rises with a second gradient sharper than the first gradient, and which performs image displaying with applied voltages at least higher than the voltage corresponding to the turning point where brightness changes from the first gradient to the second gradient.

To solve the problems of (i) the difficulty in causing the transition from the splay alignment state to the bend alignment state, (ii) the difficulty in fabricating a phase compensator of excellent properties for improving the viewing angles and (iii) the viewing angle dependence of hues which results in hue variation and color instability according to viewing angles, the twist angle of the liquid crystal molecules should be in the range of from 160° to 200° or from 250° to 290°, the liquid crystal layer should contain a dye or pigment, and image displaying is performed with driving voltage falling within a specified high range. According to the above arrangement, since the liquid crystal layer contains a dye or pigment, this liquid crystal display device utilizes the guest-host effect. Therefore, the above liquid crystal display device can overcome the viewing angle dependent of hues that is one of the outstanding problems imposed by the conventional OCB liquid crystal display devices incorporating the birefringence mode. In addition, the above display device is not in the birefringence mode, so there is no need to include a phase compensating layer. Use of the twisted liquid crystal cells enables the device to display images without the transition from the splay alignment state to the bend alignment state. Image displaying with driving voltage in a specified high range permits fast response and a satisfactorily high contrast.

According to the sixth aspect of the invention, there is provided a liquid crystal display device comprising (1) a plurality of pixel electrodes constituting a plurality of pixels, (2) a counter electrode, (3) a liquid crystal enclosed between the pixel electrodes and the counter electrode, and (4) a color filter having regions respectively corresponding to said pixels, each region transmitting any one of a plurality of colors, wherein at least either the surfaces of the pixel electrodes or the surface of the counter electrode is conditioned such that liquid crystal molecules in the vicinity of the surfaces or surface are aligned so as to form specified pretilt angles, wherein images are displayed by changing light transmission through formation of a bend alignment state of said liquid crystal, and wherein said specified pretilt angles vary according to the colors of the pixels.

In the above liquid crystal display device, hue shifts caused by the dependence of the transmission of the liquid crystal on the wavelength of transmitted light can be overcome by setting pretilt angles according to the colors of the pixels. Specifically, different pretilt angles are formed for the three primary colors so that the same voltage-transmission characteristic can be attained for the three primary colors.

DETAILED DESCRIPTION OF PREFERRED EMBODIMENT

EMBODIMENT 1

Figure 1:
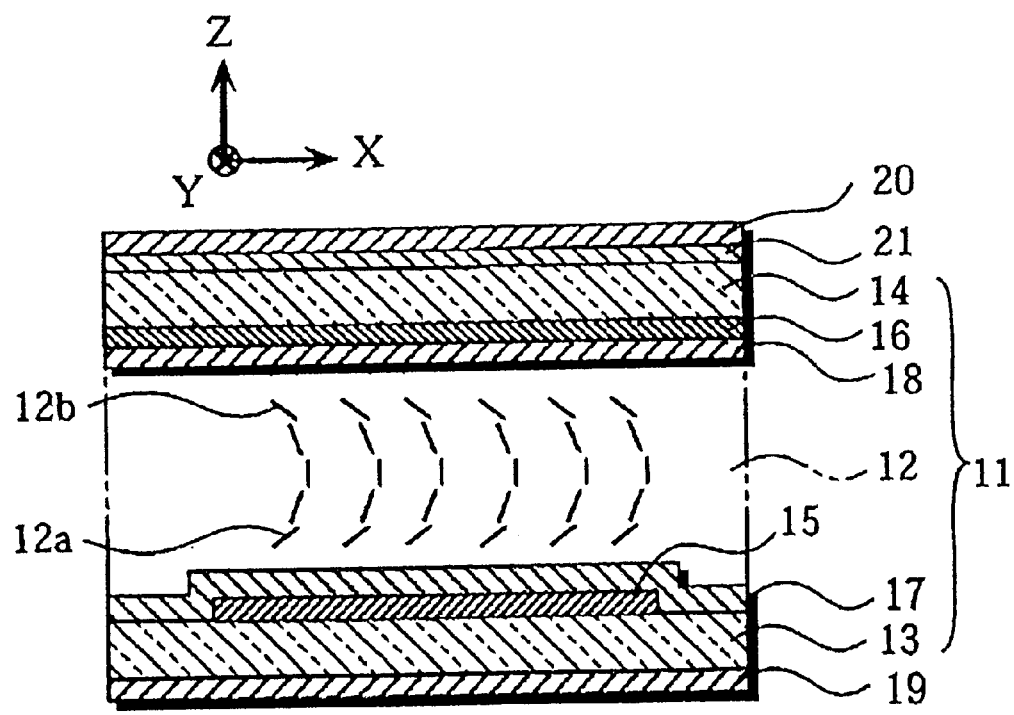
FIG. 1 is a longitudinal sectional view showing the structure of a prior art liquid crystal display device.
Figure 2:
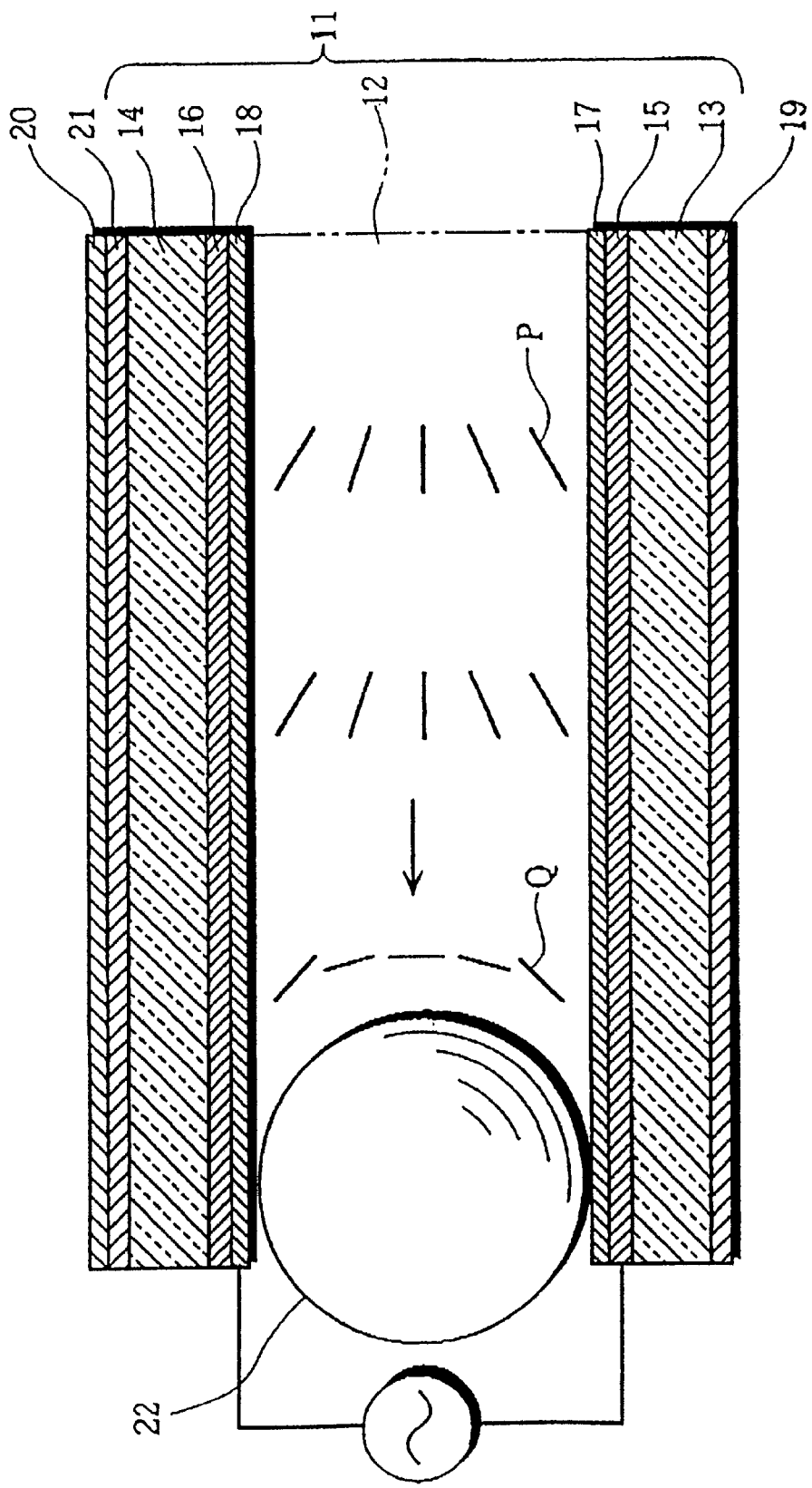
FIG. 2 is a longitudinal sectional view showing the structure of another prior art liquid crystal display device.
Figure 3:
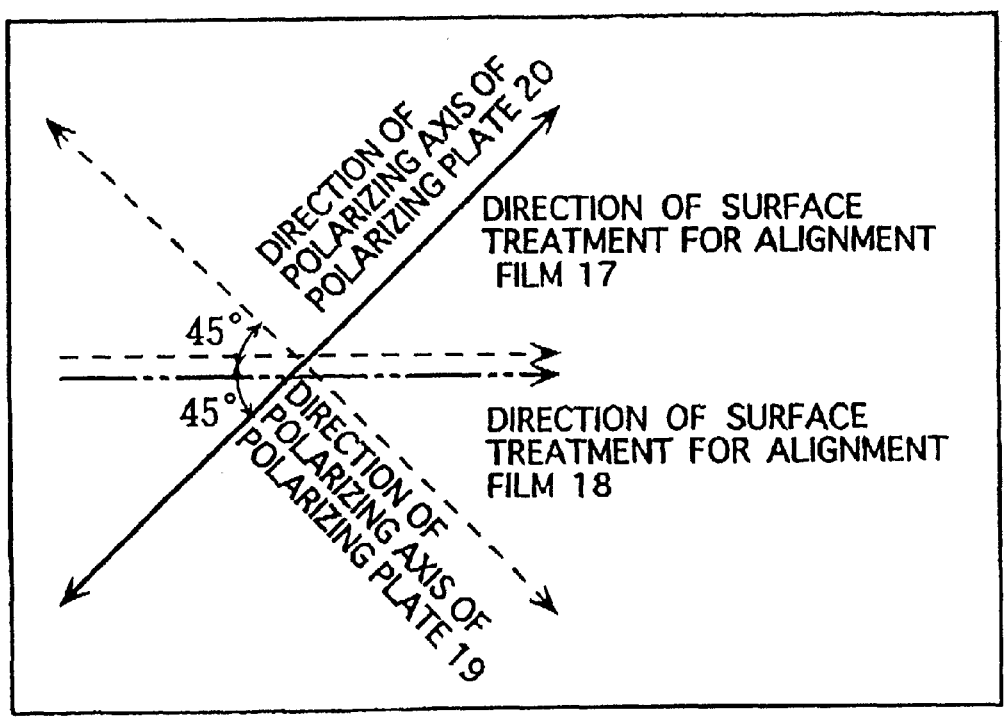
FIG. 3 is a diagram of the orientation of optical elements of a liquid crystal display device.
Figure 4:
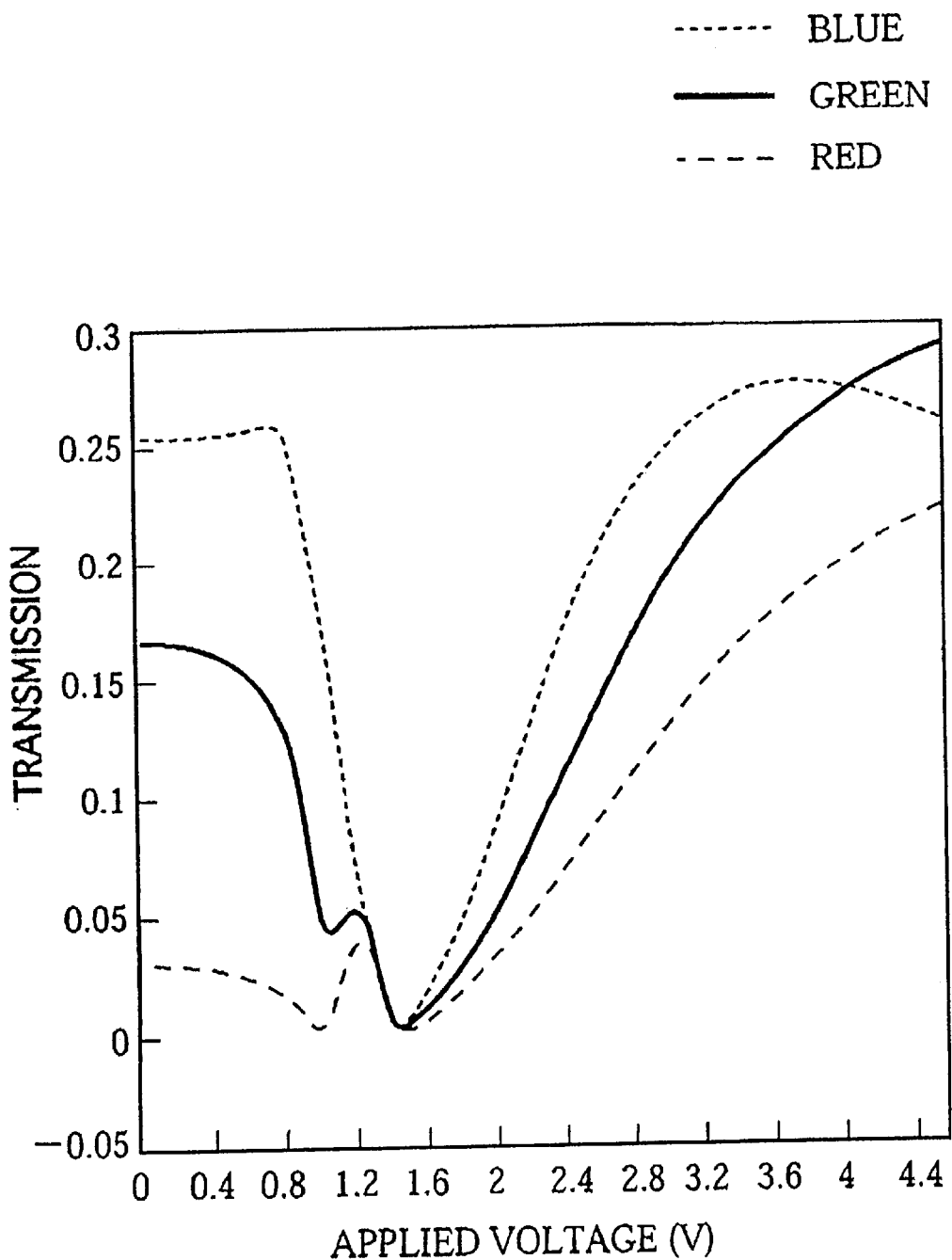
FIG. 4 shows the transmission-applied voltage characteristic of another prior art liquid crystal display device.
Figure 5:
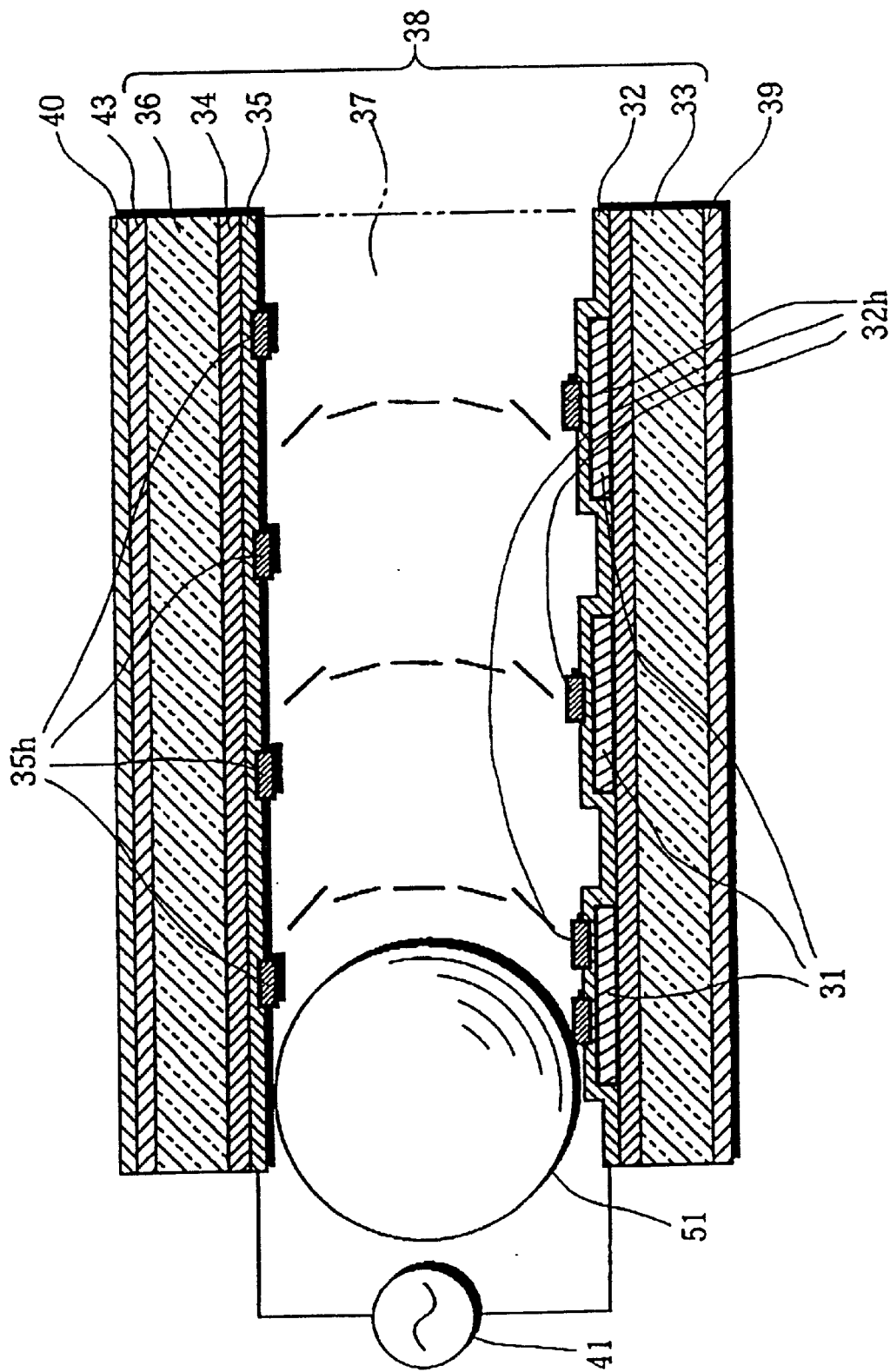
FIG. 5 is a longitudinal sectional view showing the structure of a liquid crystal display device according to first, second, third embodiments of the invention.

Now there will be explained one example of OCB liquid crystal display devices, in which the transition from the splay alignment state to the bend alignment state quickly occurs. Referring to FIG. 5, a liquid crystal cell 38 that constitutes a liquid crystal display device has transparent substrates 33, 36 made of glass, between which a nematic liquid crystal 37 ("ZLI-4792" produced by Merck KGaA) having positive dielectric anisotropy is enclosed. The transparent substrate 33 has transparent pixel electrodes 31 and an alignment film 32 formed thereon, whereas the transparent substrate 36 has a counter electrode 34 and an alignment film 35 formed thereon. Spherical spacers 51 each having a diameter of about 6 $\mu$m are interposed between the transparent substrates 33 and 36 whereby the gap distance between the substrates 33, 36 can be kept constant. Disposed on both sides of the liquid crystal cell 38 are polarizing plates 39, 40. Between the transparent substrate 36 and the polarizing plate 40 is a phase compensator 43. Each transparent pixel electrode 31 is, for instance, in the form of a 100 $\mu$m×300 $\mu$m rectangle. While there are shown only three pixels in FIG. 5, a plurality of such pixel electrodes are provided in an actual display device to display bit map images. Large pretilt angle domains 32h, 35h are formed on the alignment films 32, 35, respectively, and more specifically, at least one domain 32h or 35h is formed for each pixel. The alignment films 32, 35 are conditioned in the same direction. With this arrangement, when no voltage is applied to the liquid crystal cell 38, liquid crystal molecules are arranged in a splay alignment state, and when a specified voltage is applied, they are arranged in a bend alignment state. The process of the surface treatment applied to the alignment films 32, 35 is as follows.

(1) For forming a small pretilt angle, a polyimide surface alignment agent of the polymeric acid type, which is capable of forming a pretilt angle of about 5° and commercially available from Nissan Chemical Industries Ltd. under the number SE-7492, is used. For forming a large pretilt angle, a polyimide surface alignment agent of the prepolymerized type, which is capable of forming a pretilt angle of about 15° and commercially available from Japan Synthetic Rubber Co., Ltd. under the number JALS-246 is used. 100 parts of the former agent and 10 parts of the latter agent are mixed. The mixture is applied to the transparent pixel electrodes 31 and the counter electrode 34, and then dried and sintered to form the director alignment films 32, 35. During the drying process, the two surface alignment agents undergo phase separation so that the large pretilt angle domains 32h, 35h are formed.

(2) The entire surfaces of the alignment films 32, 35 are treated by rubbing, using, for example, a rubbing cloth made of rayon, so that the above large and small pretilt angles are attained.

A voltage of 8 V was applied by a driver circuit 41 for 10 seconds to the liquid crystal cell 38 having the large pretilt angle domains 32h, 35h which were formed on the alignment films 32, 35 as described earlier. The transition from the splay alignment state to the bend alignment state or to the twisted bend alignment state (this state is also hereinafter referred to as "bend alignment state") was seen in all the pixels irrespective of the presence or absence of the spacer 51 in their neighborhood. After application of voltage had been repeated in the same way, good repeatability was found in the occurrence of the transition. The reason for such smooth transition is that a core of the transition is first created in the large pretilt angle domains 32h, 35h and then, the transition region grows and expands from this core.

EMBODIMENT 2

In lieu of the polyimide surface alignment agent capable of forming a pretilt angle of about 15° used in Embodiment 1, a polyimide surface alignment agent of the prepolymerized type capable of forming a pretilt angle of about 70° produced by Japan Synthetic Rubber Co., Ltd. under the number JALS-204 is used in Embodiment 2, for forming a high pretilt angle. The liquid crystal cell 38 having the large pretilt angle domains 32h, 35h formed on the alignment films 32, 35 was prepared and 5 V was applied for 2 seconds to the liquid crystal cell 38. After that, the transition occurred without fail. When a small amount of surface alignment agent that forms a substantially homeotropic structure of around 90° was added, the transition readily occurred with low driving voltage.

EMBODIMENT 3

Another method for forming the large pretilt angle domains 32h, 35h similar to those in Embodiment 2 will be explained.

(1) First, a polyimide surface alignment agent of the prepolymerized type capable of forming a pretilt angle of about 5° produced by Japan Synthetic Rubber Co., Ltd. under the number JALS-212 is applied to the transparent pixel electrodes 31 and the counter electrode 34. Then, the product is dried and sintered to form the alignment films 32, 35.

(2) A polyimide surface alignment agent of the prepolymerized type capable of forming a pretilt angle of 70° and commercially available from Japan Synthetic Rubber Co., Ltd. under the number JALS-204 is printed on the alignment films 32, 35 at the positions corresponding to the transparent pixel electrodes 31 such that printed areas each having a diameter of about 10 $\mu$m are arranged at a pitch of 100 $\mu$m. Then, the product is dried and sintered to form the large pretilt angle domains 32h, 35h.

(3) Surface treatment is applied in the same way as described in the process (2) of Embodiment 1.

After a voltage of 5 V had been applied for one second to the liquid crystal cell 38 having the large pretilt angle regions 32h, 35h thus formed on the alignment films 32, 35, the transition occurred without fail.

In Embodiments 1 to 3 described above, the mixing ratio of the surface alignment agent for producing a large pretilt angle to the surface alignment agent for producing a small pretilt angle and the diameters of the large pretilt angle domains 32h, 35h, are not limited to the above figures but may be determined in accordance with the voltage and time required for the transition and with the liquid crystal material used. However, it should be noted that at least one large pretilt angle domain must be formed for every pixel. Transition is more likely to occur with the greater large pretilt angle and with the bigger difference between the large pretilt angle and the small pretilt angle. For this reason, the large pretilt angle may be in the range of from 15° to 90° and more preferably from 70° to 90°, while the difference between the larger pretilt angle and the small pretilt angle may be 10° or more. These ranges are, of course, not limitative of the large and small pretilt angles, which may be determined according to the above conditions.

EMBODIMENT 4

Figure 6:
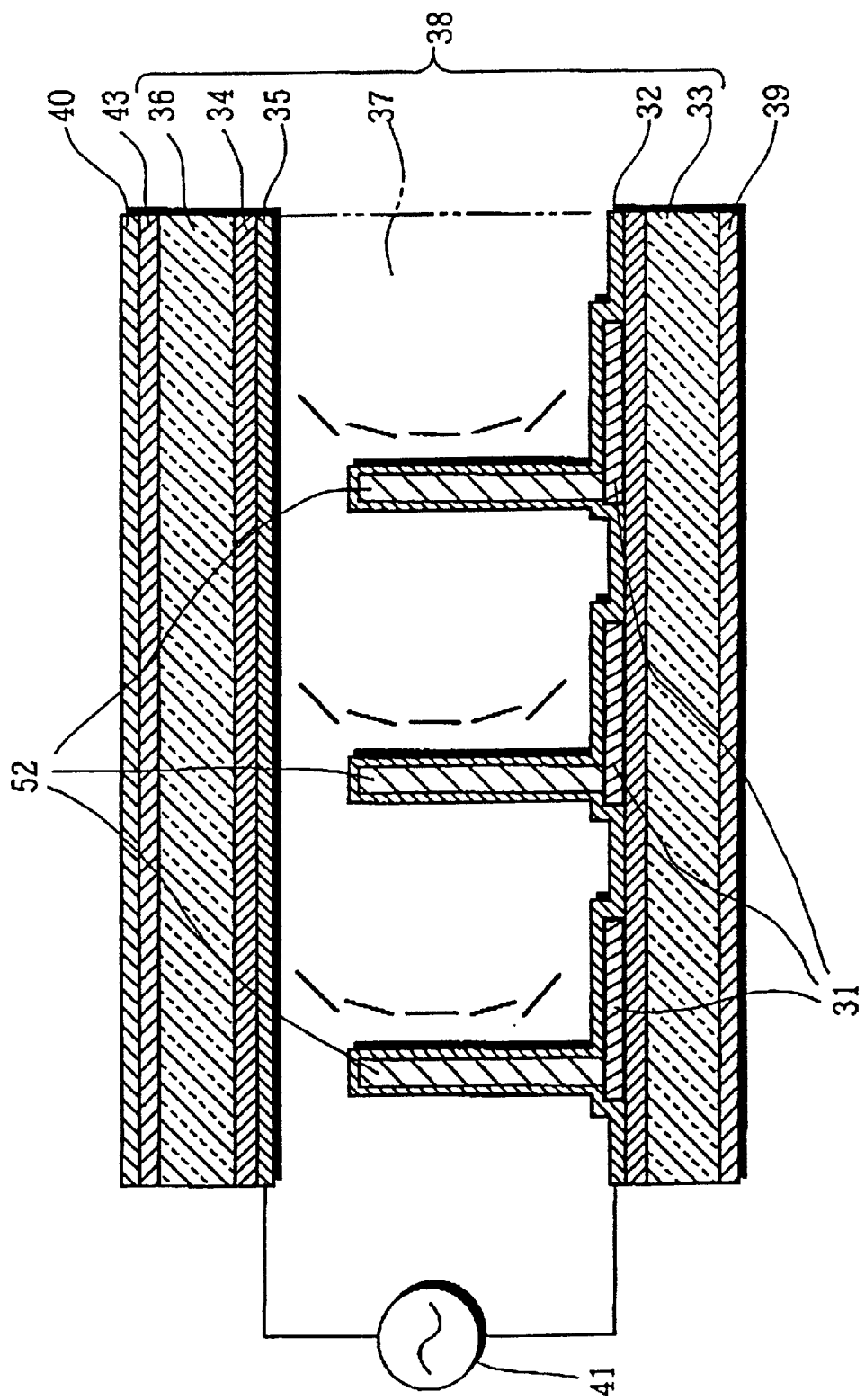
FIG. 6 is a longitudinal sectional view showing the structure of a liquid crystal display device according to a forth embodiment of the invention.

There will be explained another liquid crystal display device in which the transition from the splay alignment state to the bend alignment state smoothly occurs. In the following embodiments, elements having functions similar to those of Embodiment 1 are designated by the same reference numerals given to the elements of Embodiment 1 and the description of them is omitted. As seen from FIG. 6, a square-pole projection 52 is formed on each of the transparent pixel electrodes 31. The height and one side of the cross-section of each square-pole projection 52 are 4 $\mu$m. These projections 52 are formed from an acrylic photosensitive polymer. It should be noted that the height of the projections 52 is exaggeratedly illustrated in FIG. 6. The projections 52 can be easily formed for example through exposure and development, using corresponding masks. An alignment film 32 is formed over the surface of each transparent pixel electrode 31 and over the surface of each projection 52. This alignment film 32 is formed by application, drying, sintering and surface treatment by use of a low pretilt angle forming surface alignment agent, like the preparation of ordinary alignment films.

A voltage of 3 V was applied for one second to the liquid crystal cell 38 having the above projections 52 and it was found that the transition occurred on all the transparent pixel electrodes 31 without fail. The occurrence of the transition on all the pixel electrodes 31 is conceivably due to the fact that the liquid crystal molecules in the vicinity of each projection 52 are aligned in a virtually upright fashion along the surface of the projection 52, forming a core and a transition area grows and expands from this core.

It should be noted that projection 52 is not limited to the shape, size, material and manufacturing method mentioned above, but at least one projection 52 should be formed on each transparent pixel electrode 31. For instance, the projections 52 may be cylindrical, conical, spherical, pyramidal or prismatic, and are lower than the spacers 51 in height. To eliminate the need for the spacers 51, the projections 52 may be equal to the spacers 51 in diameter.

EMBODIMENT 5

This embodiment provides one example of the liquid crystal display devices, in which a chiral agent is added to the liquid crystal 37 to cause the smooth transition from the splay alignment state to the bend alignment state.

Figure 7:
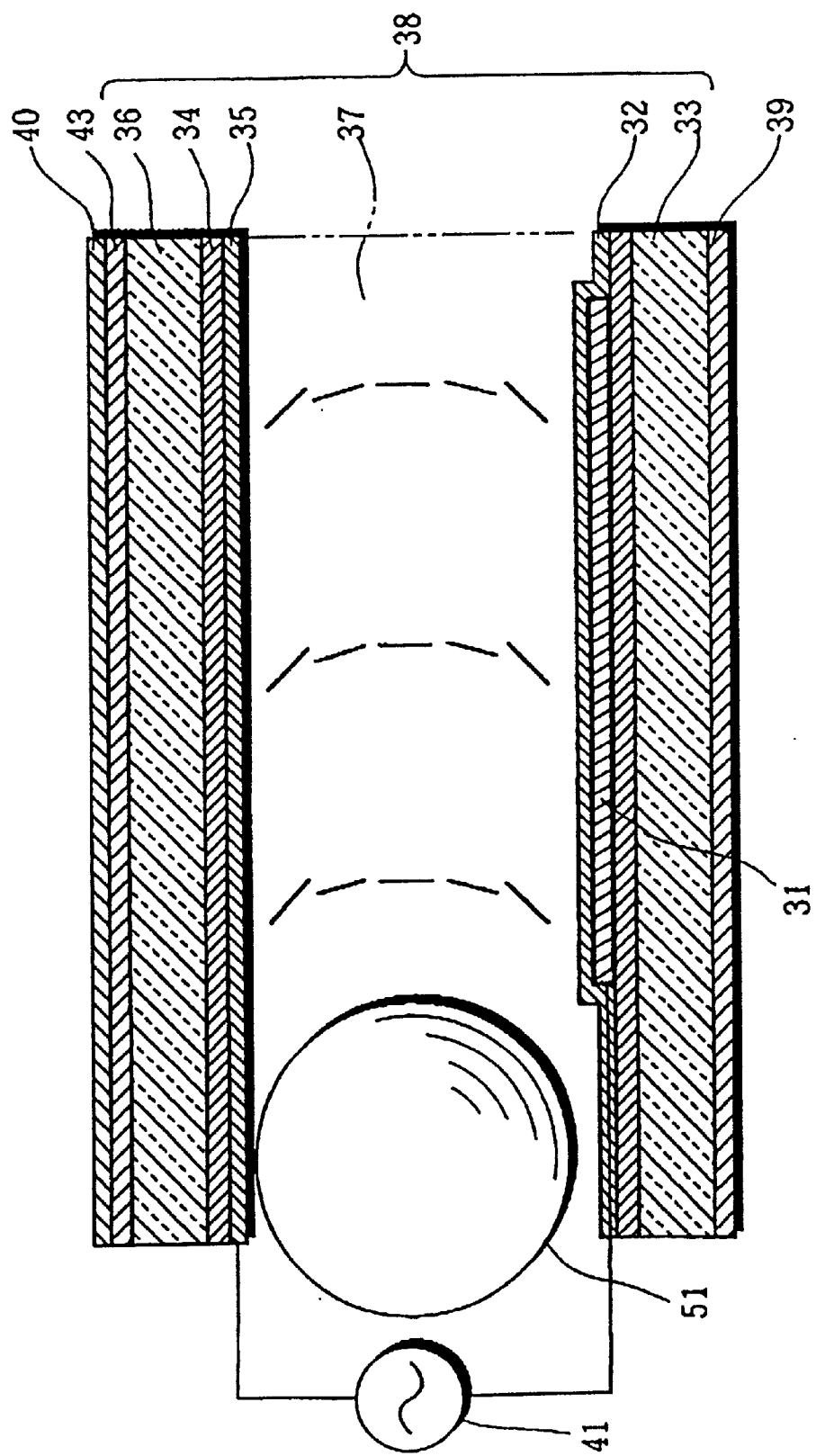
FIG. 7 is a longitudinal sectional view showing the structure of a liquid crystal display device according to a fifth embodiment of the invention.

Eleven liquid crystal display devices A1 to A11 (see FIG. 7) were prepared, which were designed similarly to the display device of Embodiment 1 except for the following points.

(a) The large pretilt angle domains 32h, 35h are not formed on the alignment films 32, 35.

(b) A polyimide surface alignment agent of the prepolymerized type capable of forming a pretilt angle of about 5° and produced by Japan Synthetic Rubber Co., Ltd. under the number JALS-212 is used for forming the alignment films 32, 35.

(c) The spacers 51 are disposed at positions where the transparent pixel electrodes 31 do not lie.

(d) Cholesteryl nonanoate serving as a left-handed chiral agent is added to a nematic liquid crystal having positive dielectric anisotropy so that the chiral pitches of the liquid crystal 37 of the devices A1 to A11 are as indicated in the following Table 1.

TABLE 1

| liquid crystal display device | chiral pitch of liquid crystal ($\mu$m) | observation result of transition at the time of voltage application | time required for uniform transition to bend alignment state (second) |
|---|---|---|---|
| A1 | 5 | transition locally occurs and expands | 1 |
| A2 | 7 | uniform transition occurs across surface with transmissivity variation | 0 |
| A3 | 10 | the same as above | 0 |
| A4 | 20 | the same as above | 0 |
| A5 | 40 | the same as above | 0 |
| A6 | 60 | transition locally occurs and quickly expands | 1 |
| A7 | 80 | the same as above | 1 |
| A8 | 100 | transition locally occurs and gradually expands | 3 |
| A9 | 120 | the same as above | 60 |
| A10 | 140 | the same as above | 120 |
| A11 | ∞ | the same as above | 600 |

A rectangular wave voltage (frequency=30 Hz, maximum voltage 3V) was applied to the liquid crystal display devices A1 to A11 respectively. The transition between the alignment states and the time required for causing uniform transition to the bend alignment state over the entire surface of each pixel were observed. The result of the observation is demonstrated in Table 1.

As seen from Table 1, in the liquid crystal display devices A2 to A5 of chiral pitches from 7 $\mu$m to 40 $\mu$m (i.e., 7 $\mu$m $\leq$ chiral pitch $\leq$ 40 $\mu$m), transmission changed instantly across the surface of each pixel and no alignment defects were found. That is, the transition from the splay alignment state to the bend alignment state is thought to have taken place smoothly.

In the liquid crystal display devices A1 (chiral pitch=5 $\mu$m), A6 to A8 (60 $\mu$m $\leq$ chiral pitch $\leq$ 100 $\mu$m), the transition locally occurred and expanded in a considerably short time. In other words, the transition occurred across the surface of each pixel with a comparatively small amount of electric energy.

In the liquid crystal display devices A9 to A11 (120 $\mu$m $\leq$ chiral pitch $\leq$ ∞), the transition first occurred locally, and voltage had been applied for a long time (1 to 10 minutes) before the transition occurred across the surface of each pixel. This means that a large amount of electric energy was needed to cause the transition throughout the pixel surface.

It will be understood from the result that the electric energy required for the transition from the splay alignment state to the bend alignment state can be reduced and such transition can be carried out without fail, by adding a chiral agent to the liquid crystal 37 to impart a twist component to the liquid crystal 37 and to achieve a chiral pitch of 5 to 100 $\mu$m, and, more preferably, 7 to 40 $\mu$m.

EMBODIMENT 6

This embodiment provides a liquid crystal display device in which a chiral agent is added to the liquid crystal 37 employed in Embodiment 2. More specifically, cholesteryl nonanoate serving as a left-handed chiral agent is added to the liquid crystal 37 to attain a chiral pitch of 50 $\mu$m in this embodiment. Like Embodiment 2, the liquid crystal cell 38 having the large pretilt angle domains 32h, 35h is designed to contain the above liquid crystal 37 between the transparent substrates 33, 36. The spacers 51 are disposed at positions where the transparent pixel electrodes 31 do not lie.

A rectangular wave voltage (frequency=30 Hz, maximum voltage=3V) was applied to the above liquid crystal display device having the liquid crystal cell 38. Then, the transition to the bend alignment state and the time required for attaining the uniform transition across the surface of each pixel were observed. The transition firstly occurred in the large pretilt angle domains 32h, 35h and then expanded in a considerably short time, say, in one second over the entire surface of each pixel. This means that the uniform transition across the pixel surface could be achieved by a relatively small amount of electric energy. It is understood from the observation that a core for the transition was first created in the large pretilt angle domains 32h, 35h and the transition was promoted by the addition of the chiral agent to the liquid crystal 37 so that the splay alignment state was changed to the bend alignment state very quickly.

It should be noted that the same inventive effect can be obtained by adding a chiral agent to the liquid crystal 37 of the liquid crystal display device of Embodiment 1 or Embodiment 3. The pretilt angle may be selected from a wide range as described in Embodiment 3. While the spacers 51 are disposed at positions where the transparent pixel electrodes 31 do not lie for the sake of observation in Embodiment 5 and Embodiment 6, they may be placed at positions where the transparent pixel electrodes 31 are disposed.

EMBODIMENT 7

Figure 8:
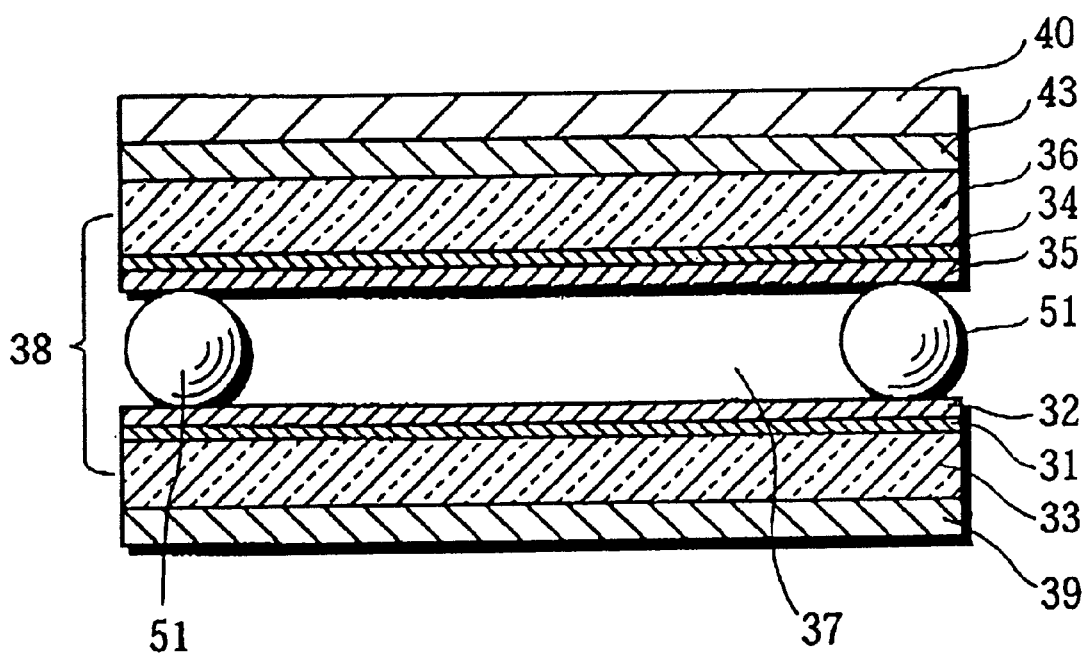
FIG. 8 is a longitudinal sectional view showing the structure of a liquid crystal display device according to a seventh embodiment of the invention.
Figure 9:
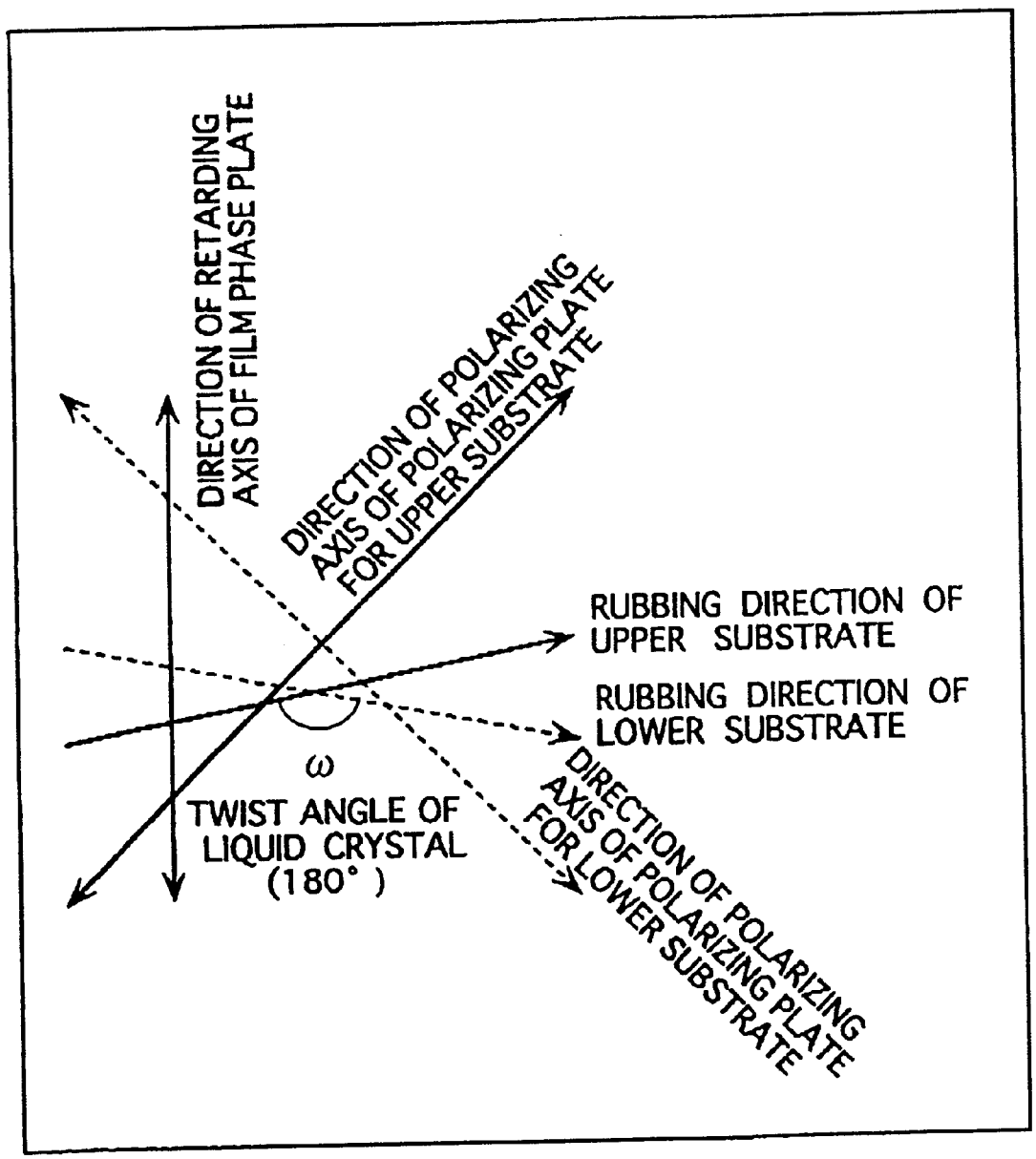
FIG. 9 is a diagram of the orientation of optical elements of the liquid crystal display device according to the seventh embodiment.

This embodiment relates to a liquid crystal display device which does not need the transition between the alignment states required by the OCB mode. That is, the liquid crystal display device of this embodiment is not an OCB liquid crystal display device, but capable of providing a response as fast as the OCB mode by virtue of the alignment condition similar to that of the OCB mode and its mechanism. As seen from FIG. 8, the physical structure of the liquid crystal display device of this embodiment is similar to that of Embodiment 5 (see FIG. 7), but differs from the latter in the directors of the alignment films 32, 35 as shown in FIG. 9. Specifically, the twist angle ω of the liquid crystal molecules of this embodiment is 180°.

The liquid crystal display device of Embodiment 7 is fabricated in the following procedure.

(1) Two transparent substrates 33, 36 made of glass and having the transparent pixel electrodes 31 and the counter electrode 34 respectively are coated with a polyamic acid type polyimide surface alignment agent RN-474 produced by Nissan Chemical Industries Ltd. by spin coating. Then, the coating material is cured at 180° within a thermostatic chamber over one hour, thereby preparing the alignment films 32, 35.

(2) The alignment films 32, 35 are rubbed with a rayon rubbing cloth in the direction indicated in FIG. 9 so as to produce a twist angle ω of 180°.

(3) The spacers 51 produced by Sekisui Fine Chemical Co., Ltd. are interposed between the transparent substrates 33, 36 so as to create a gap distance of 6 μm between the substrates 33, 36. These substrates 33, 36 are then bonded by use of Structbond 352A (sealing resin) produced by Mitsui Toatsu Chemical Co., Ltd., thereby forming the liquid crystal cell 38.

(4) Cholesteryl nonanoate serving as a left-handed chiral agent is added to the positive nematic liquid crystal material ZLI-2411 (NI point=65°, Δn=0.140) produced by Merck KGaA to produce the liquid crystal 37.

(5) The liquid crystal 37 is injected into the gap between the transparent substrates 33, 36 placed in an evacuated chamber and then sealed.

(6) The polarizing plates 39, 40 and the phase compensator 43 (=bi-axial phase-different film) having a retardation of 50 nm are bonded to the liquid crystal cell 38 such that they are oriented as shown in FIG. 9, thereby fabricating the liquid crystal display device.

Figure 10:
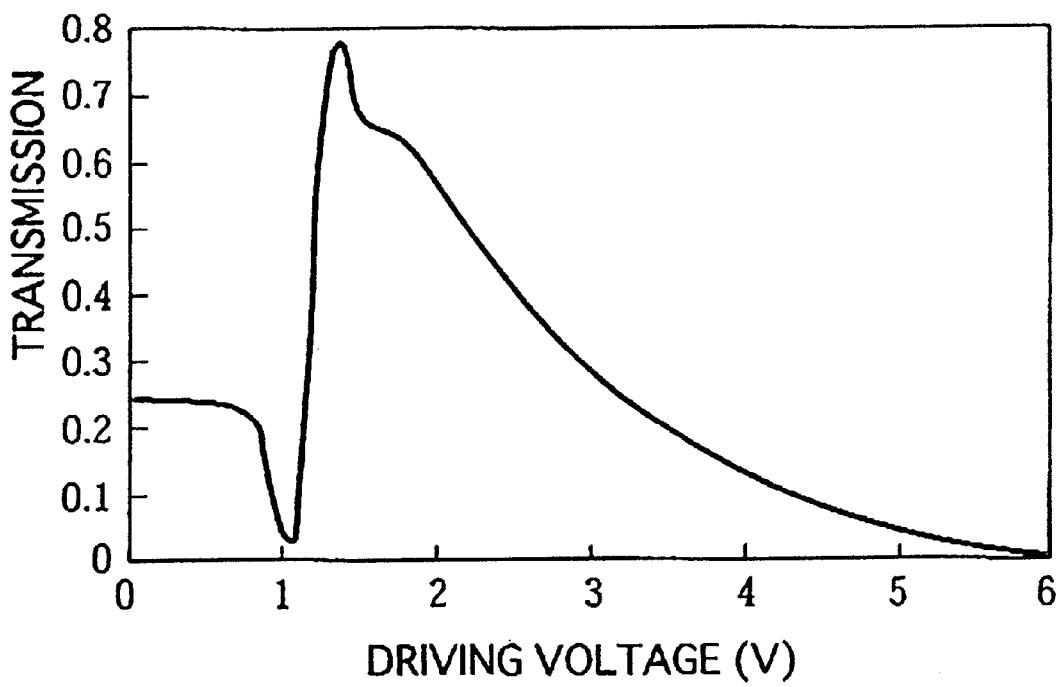
FIG. 10 shows the voltage-transmission characteristic of the liquid crystal display device according to the seventh embodiment.

FIG. 10 shows the result of a measurement of the voltage-transmission characteristic of the liquid crystal display device fabricated in the above procedure. In the measurement, a rectangular wave having a frequency of 30 Hz was applied to the liquid crystal display device with a known method. It is understood from FIG. 10 that the change in the alignment of the liquid crystal molecules is continual and an alignment state similar to the bend alignment state can be obtained smoothly and reliably. When displaying images with applied voltages of 1.8V to 6V, the contrast ratio is 230:1.

Table 2 shows the sum of response times when the applied voltage is changed from V1 to V2 and when the applied voltage is changed from V2 to V1. It is understood from Table 2 that fast response can be obtained when changing applied voltage between two levels corresponding to two halftones that have a slight difference in brightness.

TABLE 2

| V1 (V) | V2 (V) | V1 → V2 → V1 sum of response times (msec) |
|---|---|---|
| 1.8 | 2.4 | 31 |
| 2.4 | 3.0 | 29 |
| 3.0 | 3.6 | 26 |
| 3.6 | 4.2 | 25 |
| 4.2 | 4.8 | 26 |
| 4.8 | 5.4 | 23 |
| 5.4 | 6.0 | 21 |

The operational condition of this liquid crystal display device is as follows. When no voltage is applied to the device, the alignment of the liquid crystal molecules is the same as that of the STN (Super Twisted Nematic) mode because the alignment films 32, 35 are conditioned so as to produce a twist angle ω of 180°. When a voltage of 1.8V (with which transmission becomes maximal as shown in FIG. 10) or more is applied to the device, the alignment of the liquid crystal molecules becomes similar to that of the OCB mode. Therefore, fast response as indicated above can be obtained. Even when the above voltage is applied to the device, the liquid crystal molecules are kept in the twisted condition so that discrete phase transition such as the transition from the splay alignment state to the bend alignment state as seen in the OCB mode will never occur. This arrangement permits image displaying just after application of voltage.

According to the liquid crystal display device of Embodiment 7, as the liquid crystal molecules are in the twisted condition as described above, the polarizing plates 39, 40 may be disposed with their polarizing axes being parallel to each other (i.e., parallel nicol) instead of the cross nicol arrangement where the polarizing axes cross at right angles as shown in FIG. 9. In this case, normally black display is carried out. Specifically, the brightness of display images decreases as the applied voltage decreases. It should be noted that the phase difference of the phase compensator 43 needs to be selected according to the arrangement of the polarizing axes, because the appropriate value of phase difference when the polarizing axes cross at right angles differs from that when the polarizing axes are parallel to each other.

EMBODIMENT 8

The liquid crystal display device of Embodiment 8 has the same structure as that of Embodiment 7 but differs from the latter principally in the twist angle ω of the liquid crystal molecules.

Seven liquid crystal display devices B1 to B7 were fabricated, which have the same structure as the liquid crystal display device of Embodiment 7 except for the following points.

(a) As the liquid crystal 37, a positive nematic liquid crystal ZLI-2293 (NI point=85°, Δ=0.140) commercially available from Merck KGaA is used. As a left-handed chiral agent, cholesteryl nonanoate is used to produce a chiral pitch of 10 μm.

(b) The thickness of the liquid crystal layer is 5 μm.

(c) The phase compensator 43 employed in Embodiment 7 is not used.

(d) The twist angle ω of each device is as shown in Table 3.

TABLE 3

| liquid crystal display device | twist angle of liquid crystal | response time (msec) |
|---|---|---|
| B1 | 150 | 41 |
| B2 | 160 | 28 |
| B3 | 170 | 27 |
| B4 | 180 | 23 |
| B5 | 190 | 27 |
| B6 | 200 | 29 |
| B7 | 210 | 40 |

Figure 11:
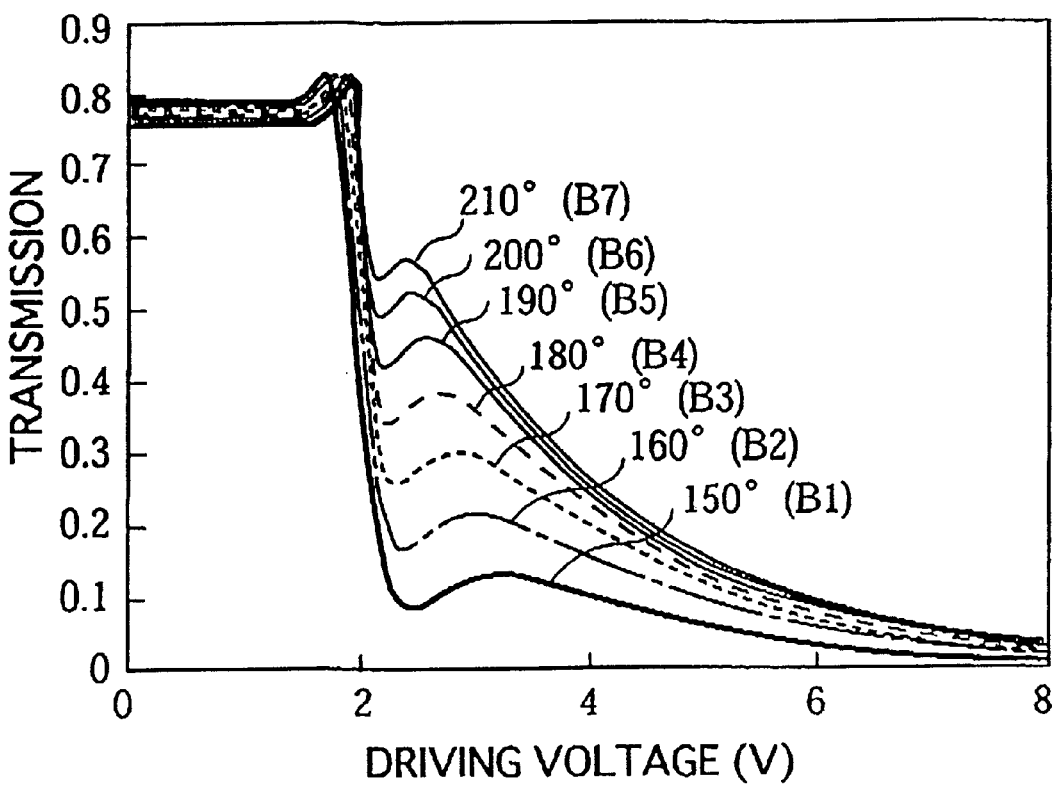
FIG. 11 shows the voltage-transmission characteristic of the liquid crystal display device according to an eighth embodiment of the invention.

FIG. 11 shows the voltage-transmission characteristic of each of the liquid crystal display devices B1 to B7 when measured at room temperature. Table 3 demonstrates the sum of response times when the applied voltage is changed from V1 to V2 and when the applied voltage is changed from V2 to V1 in the case of each device, the values of V1 and V2 for each device being shown in Table 4. For example, in the case of the device B1, the sum is obtained by adding the response time when the applied voltage is changed from 3.1V to 4.1V to the response time when the applied voltage is changed from 4.1V to 3.1V.

TABLE 4

| liquid crystal display device | V1 (V) | V2 (V) |
|---|---|---|
| B7 | 2.3 | 3.3 |
| B6 | 2.4 | 3.4 |
| B5 | 2.5 | 3.5 |
| B4 | 2.6 | 3.6 |
| B3 | 2.8 | 3.8 |
| B2 | 3.0 | 4.0 |
| B1 | 3.1 | 4.1 |

As seen from Table 3, in each case, fast response can be obtained by applying a voltage higher than the voltage that causes the maximal value of transmission, with the twist angle ω being in the range of from 160° to 200°. When the twist angle ω falls in the above range, the movement of the liquid crystal molecules is little disturbed by the backflow caused by application of voltage, so that response as fast as that of the OCB mode can be achieved.

Although the phase compensator 43 is not provided in this embodiment, the phase compensator 43 suited for each liquid crystal display device may be employed to obtain higher contrast display image. The brightness characteristics when viewing each device squarely can be adjusted by optimizing the phase difference Δnd of the liquid crystal cell 38 when no voltage is applied. While the chiral pitch of the liquid crystal 37 is twice the thickness of the layer of the liquid crystal 37 in this embodiment, it may range from one to three times, because if the chiral pitch is less that the thickness of the layer 37, the twist angle ω becomes larger than the desired angle by 180° and if the chiral pitch is more than three times the thickness of the layer 37, the condition of the director alignment becomes instable.

EMBODIMENT 9

This embodiment provides an OCB liquid crystal display device where the transition from the splay alignment state to the bend alignment state is caused continuously and reversibly, by setting the twist angle ω to 10°. The liquid crystal display device of Embodiment 9 is an OCB liquid crystal display device similar to that of Embodiment 5, but differs from the latter in that the twist angle ω of the liquid crystal molecules is 10° as indicated in FIG. 12.

The liquid crystal display device of Embodiment 9 is fabricated in the same procedure as Embodiment 7 but different from the latter in the following points.

(a) A prepolymerized type polyimide surface alignment agent AL-5062 produced by Japan Synthetic Rubber Co., Ltd. is used as the alignment films 32, 35.

Figure 12:
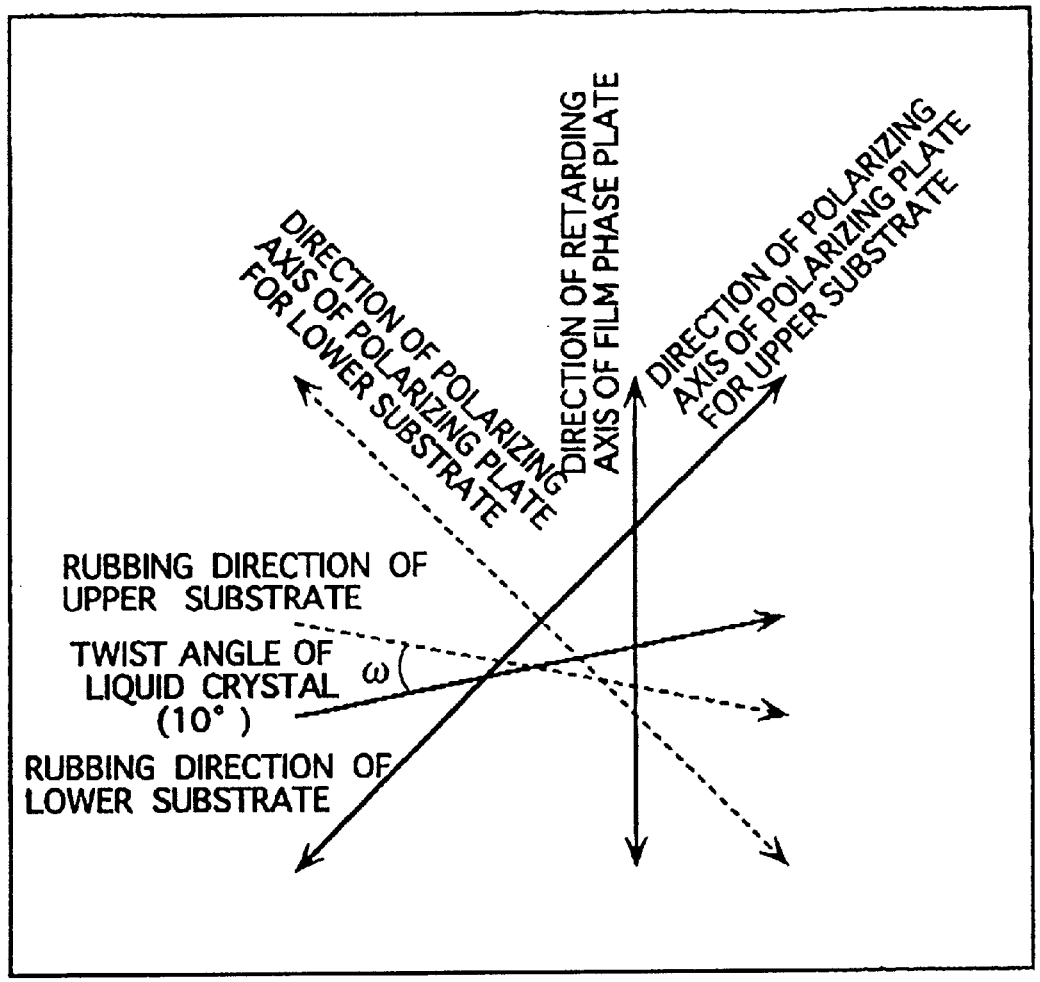
FIG. 12 is a diagram of the orientations of optical elements of the liquid crystal display device according to a ninth embodiment of the invention.

(b) The alignment films 32, 35 are rubbed in the direction shown in FIG. 12 to produce a twist angle ω of 10°.

(c) The transparent substrates 33, 36 are bonded with a gap distance of 7 μm.

(d) A positive nematic liquid crystal material LIXON-5052 (NI point=104°, Δn=0.102) produced by Chisso Corporation which does not contain a chiral agent is used as the liquid crystal 37.

(e) The phase compensator 43, which has a phase difference of 45 nm when observed in a normal direction and is composed of a uniaxial film and a biaxial film bonded to each other, is bonded as shown in FIG. 12.

Figure 13:
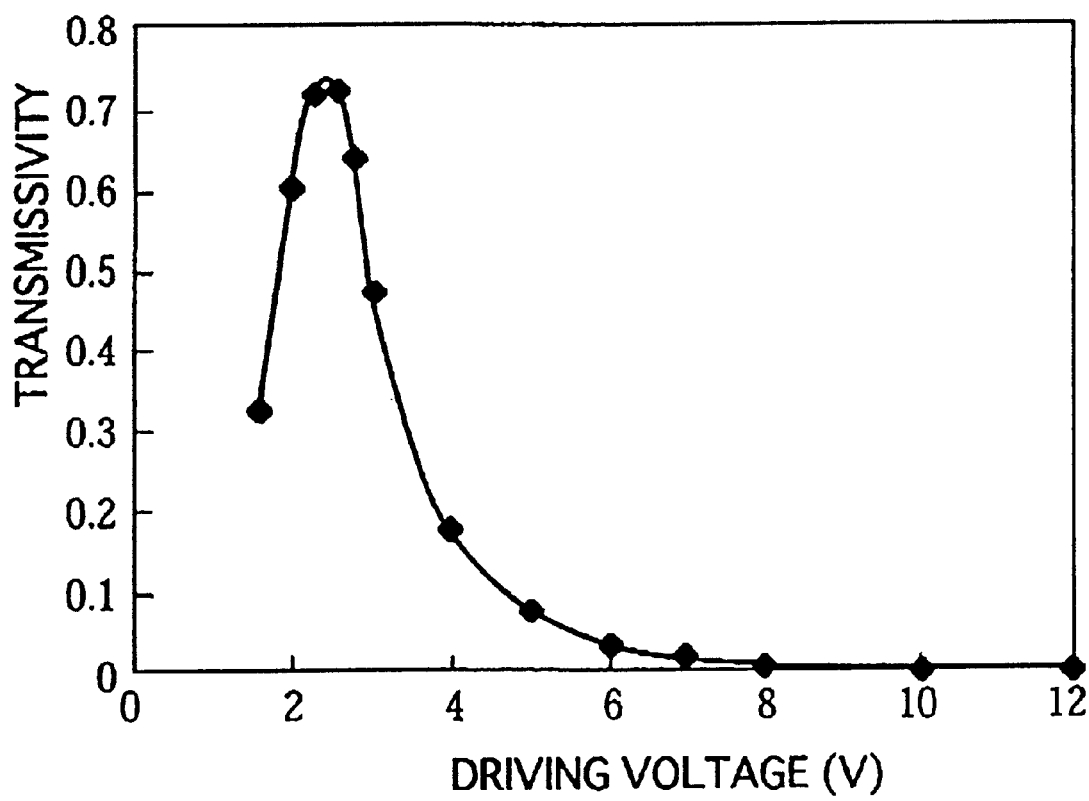
FIG. 13 shows the voltage-transmission characteristic of the liquid crystal display device according to the ninth embodiment.

A rectangular wave having a frequency of 30 Hz was applied by a known method to the liquid crystal display device fabricated under the above conditions and then the voltage-transmission characteristic of the device was measured. FIG. 13 shows the result of the measurement. The liquid crystal molecules were in the splay alignment state with no voltage applied to the device, but they were brought into the bend alignment state when the applied voltage was in the vicinity of about 2.3V. It was confirmed from the observation that the change in the alignment of the liquid crystal molecules at that time was continual and reversible and the transition to the bend alignment state was smoothly performed without fail. When image displaying was performed with applied voltages from 2.3V to 10V, the contrast ratio was 315:1. The sum of the response times when changing the applied voltage from 2.3V to 2.8V and when changing vice versa was 22 msec. Thus, fast response could be obtained when changing applied voltage between two levels corresponding two halftones which has a slight difference in brightness. Additionally, faster response was observed when driving the device with a large driving voltage amplitude.

As described above, the liquid crystal display device of this embodiment is an OCB liquid crystal display device in which twisting power is given to the alignment of the liquid crystal. With this arrangement, the transition from the splay alignment state to the bend alignment state can be carried with excellent reliability and repeatability so that it finds a wide range of applications.

EMBODIMENT 10

Figure 14:
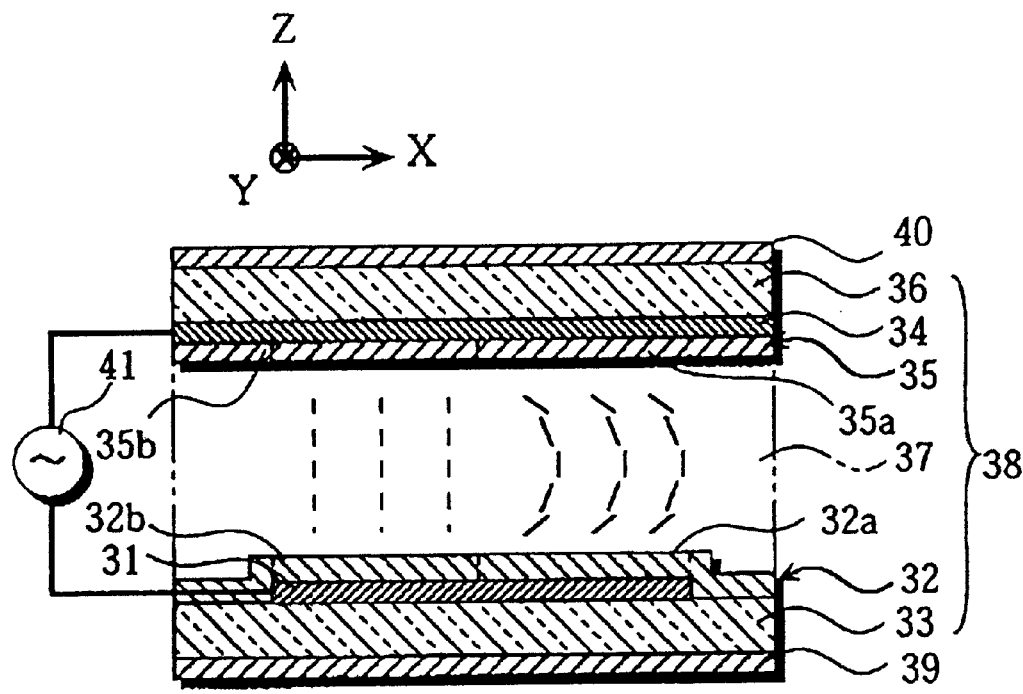
FIG. 14 is a longitudinal sectional view showing the structure of a liquid crystal display device according to a tenth embodiment of the invention.

This embodiment provides a bend mode liquid crystal display device which has improved viewing angles in various directions without use of the phase compensator 43. As seen from FIG. 14, the mechanical structure of this liquid crystal display device is similar to the structure of the device of Embodiment 5 (see FIG. 7) except for the following points: (a) For fabricating the alignment films 32, 35, a different material is used (described later). (b) The alignment films 32, 35 are respectively divided into two domains. (c) There is not provided the phase compensator 43. (d) The gap distance between the transparent substrates 33, 36 is 8 µm. (e) The liquid crystal 37 does not contain a chiral agent.

Figure 15:
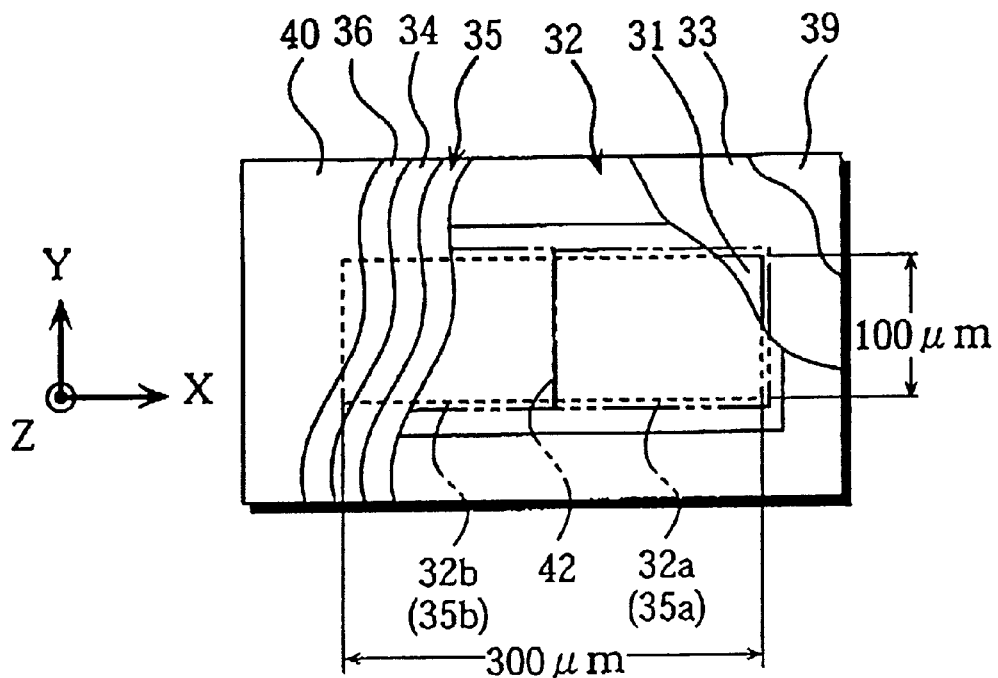
FIG. 15 is a partially sectional top view showing the structure of the liquid crystal display device according to the tenth embodiment.

Next, the division of the alignment films 32, 35 will be described in detail. As shown in FIG. 15, the alignment films 32, 35 formed on the transparent substrates 33, 36 are divided into two domains 32a, 32b and domains 35a, 35b respectively, at the regions corresponding to the transparent pixel electrodes 31. The alignment films 32, 35 are conditioned so as to form a bend director alignment in which the liquid crystal molecules contacting the opposed pairs of domains 32a, 35a lie in the plane including X and Z axes whereas the liquid crystal molecules contacting the opposed pairs of domains 32b, 35b lie in the plane including Y and Z axes. More specifically, the domains 32a, 35a are conditioned such that the director field proximate to them has a pretilt angle of about 5° with respect to X axis, while the domains 32b, 35b are conditioned such that the director field proximate to them has a pretilt angle of about 5° with respect to Y axis.

The above alignment films 32, 35 are formed and conditioned in the following way.

(1) A prepolymerized-type, polyimide surface alignment agent (e.g., AL-0656 produced by Japan Synthetic Rubber Co., Ltd.) is applied to the transparent pixel electrodes 31 and the counter electrode 34, dried and sintered, thereby forming the alignment films 32, 35.

(2) The entire surfaces of the alignment films 32, 35 are rubbed with a rubbing cloth made of rayon so that the liquid crystal molecules on the surface of the alignment films 32, 35 form a pretilt angle of about 5° with respect to Y axis.

(3) Masking is carried out utilizing the photolithographic technique such that only the domains 32a, 35a of the alignment films 32, 35 are exposed.

(4) Rubbing is done with a rayon rubbing cloth similarly to the step (2) such that only the domains 32a, 35a form a pretilt angle of about 5° with respect to X axis.

In the liquid crystal cell 38 thus formed, a rectangular wave voltage (amplitude=3V, frequency=30 Hz) was applied between the transparent pixel electrodes 31 and the counter electrode 34 by the driver circuit 41. Then, the condition of the director alignment of the liquid crystal 37 was observed with a polarization microscope. It was found that, there are formed, in the liquid crystal 37 contacting the alignment film 32 formed on the transparent pixel electrodes 31, (i) the bend director field oriented in the direction of X axis and proximate to the domain 32a and (ii) the bend director field oriented in the direction of Y axis and proximate to the domain 32b, these differently oriented director fields being separated by a disclination line 42.

The plates 39, 40 were disposed on both sides of the liquid crystal cell 38 respectively. A specified image signal voltage was applied between the transparent pixel electrodes 31 and the counter electrode 34, and viewing angles in various planes perpendicular to the displaying plane were checked utilizing back light or reflection light. The same large viewing angle characteristics (e.g., about ±55°) were obtained in the plane including the X and Z axes and in the plane including the Y and Z axes. The substantially similar viewing angle characteristics were found in other planes than the above planes. This means that the liquid crystal display device of Embodiment 10 is capable of displaying images that are highly bright, well-contrasted and free from gray scale inversion, when viewed from various directions.

EMBODIMENT 11

Figure 16:
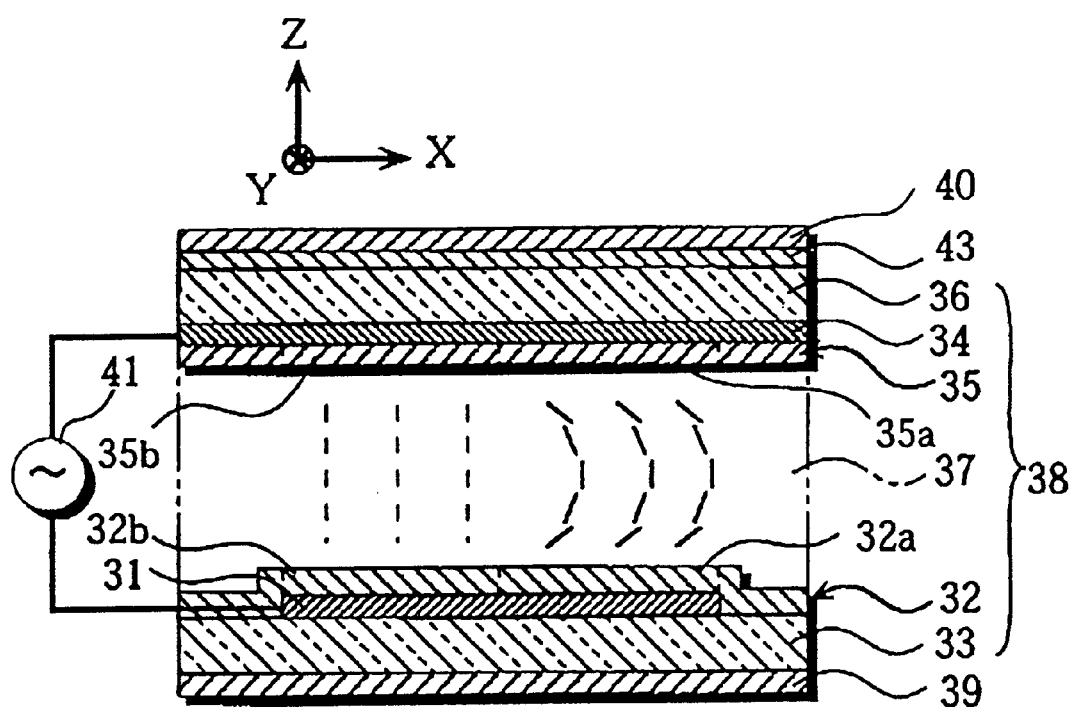
FIG. 16 is a longitudinal sectional view showing the structure of a liquid crystal display device according to an eleventh embodiment of the invention.

In addition to the optical elements employed in Embodiment 10, there may be provided the negative-type, phase compensator 43 for optical compensation between the transparent substrate 36 and the polarizing plate 40 as shown in FIG. 16. The use of the phase compensator 43 permits a further improvement in viewing angles (for example, about ±60°) and a reduction in the driving voltage. The phase compensator 43 may be provided between the transparent substrate 33 and the polarizing plate 39 instead of providing it between the transparent substrate 36 and the polarizing plate 40, or alternatively provided at both positions.

EMBODIMENT 12

The surface treatment for the alignment films 32, 35 may be carried out in the following way.

(1) Like the step (1) of Embodiment 10, a surface alignment agent (e.g., PI-610 produced by Nissan Chemical Industries Ltd.) is applied to the transparent pixel electrodes 31 and the counter electrode 34, dried and then sintered to form the alignment films 32, 35.

Figure 17:
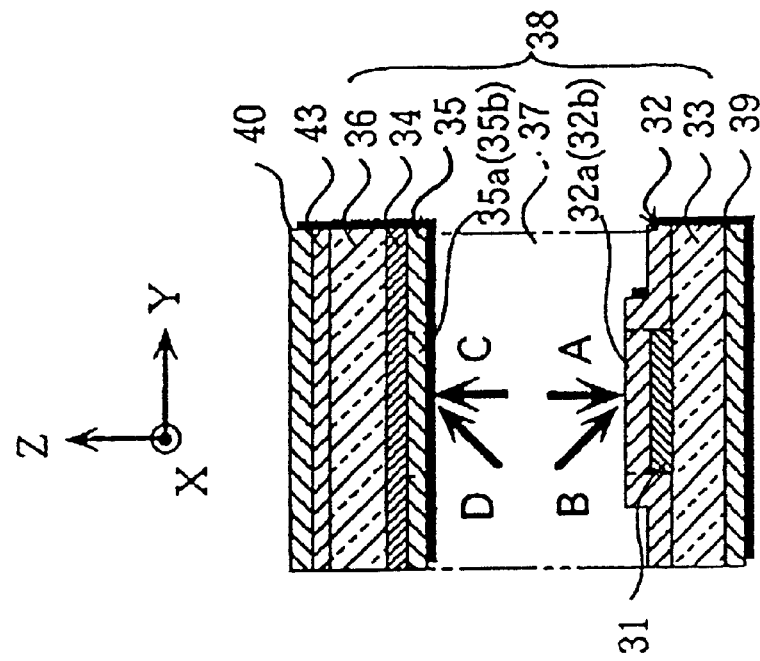
FIGS. 17(*a*) and 17(*b*) show surface alignment techniques according to a twelfth embodiment of the invention.
Figure 17:
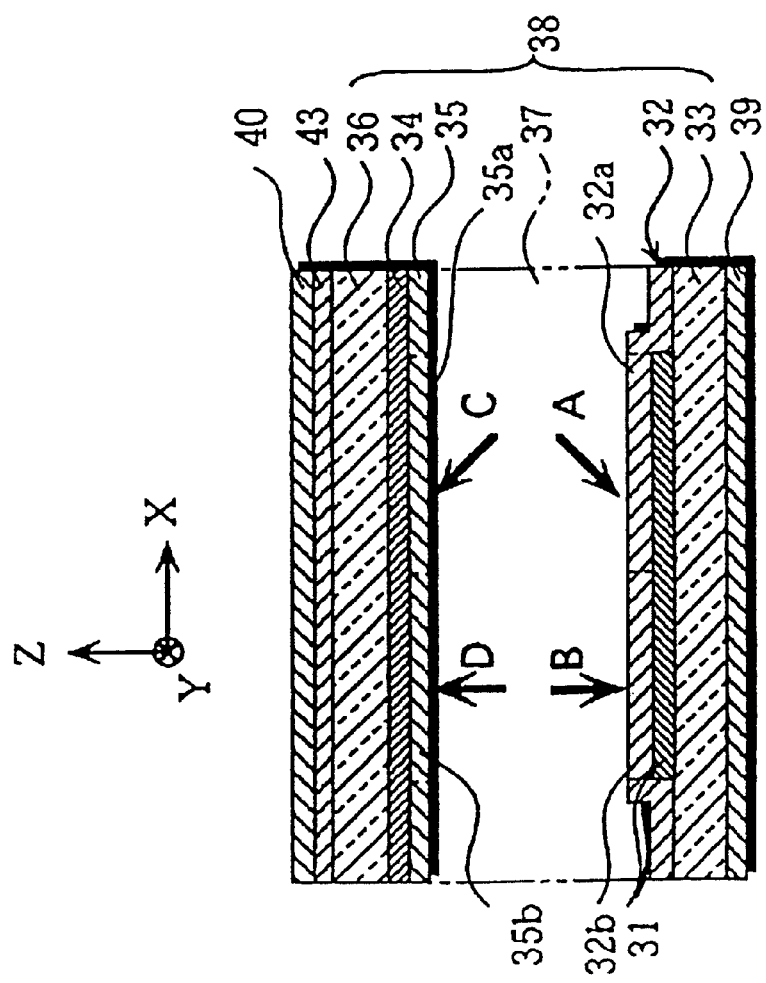

(2) As shown in FIG. 17, ultraviolet light (wavelength= 365 nm, energy density=4.5 mW/cm$^2$, polarizing direction=the direction of Y-axis) is directed in the direction of arrow A (i.e., at about 45° with respect to X axis in the plane including X and Z axes) onto the position (corresponding to the domain 32a to be formed) of the alignment film 32 for 10 minutes so that the liquid crystal molecules near the surface of the alignment film 32 in this position are aligned at a pretilt angle of about 5° relative to the X axis.

(3) Similarly to the above step (2), ultraviolet light (polarizing direction=the direction of the X axis) is directed in the direction of arrow B onto the position (corresponding to the domain 32b to be formed) of the alignment film 32 so that the liquid crystal molecules near the surface of the alignment film 32 in this position are aligned at a pretilt angle of about 5° relative to the Y axis.

(4) Similarly to the steps (2) and (3), ultraviolet light is directed in the directions of arrow C and arrow D onto the positions (corresponding to the domains 35a, 35b to be formed) of the alignment film 35, respectively so that the liquid crystal molecules near the surface of the alignment film 35 in these positions are aligned at pretilt angles, symmetrically to the director fields of the domains 32a, 32b of the alignment film 32 respectively.

The director fields may be formed in the plane including the X and Z axes as well as in the plane including the Y and Z axes like Embodiment 10, by the above-described radiation of ultraviolet lights having different polarizing directions and different radiating directions. In addition, this technique provides the advantages that it can facilitate uniform surface treatment and that it avoids a possible decrease in yield which would be caused by damage to the alignment films due to photolithography. In consequence, highly improved stability of director alignment can be achieved.

The radiating conditions, radiating directions and polarizing directions of ultraviolet light are not limited to those described above but may be varied according to the materials of the liquid crystal 37 and the alignment films 32, 35. Further, the surface treatment may comprise not only the above-described radiation of ultraviolet light but also rubbing carried out prior to and/or after the radiation step. It should be noted that the surface treatment of this embodiment may be applied to other embodiments.

While Embodiments 10 to 12 have been described with cases where the alignment films are respectively divided into two domains which causes two director fields in planes crossing at right angles, other ways of division may be possible. For example, the films are respectively divided into a plurality of domains to form a plurality of director fields so that viewing angles in various directions can be improved. The domains do not necessarily have the same size but may be varied in size according to the viewing angle characteristics. The transition from the initial director alignment state to the bend alignment state at the time of a start of voltage application may be speeded up by adding an appropriate amount of chiral agent (e.g., cholesteryl nonanoate) to the liquid crystal 37, so that the speed of response can be increased. In this case, although the bend director alignment of the liquid crystal 37 includes twist, the same effect on viewing angles can be achieved.

EMBODIMENT 13

This embodiment provides a liquid crystal display device which does not require, unlike the OCB mode, use of a phase compensator nor the arrangement in which the polarizing plate is disposed with its polarizing axis being oriented in a direction different from the conditioning direction of the alignment films. The liquid crystal display device of Embodiment 13 is similar to the OCB mode in terms of the alignment condition, but has the same principle as the Guest-host mode (hereinafter referred to as "GH" mode) has in terms of reproducing light levels.

Figure 18:
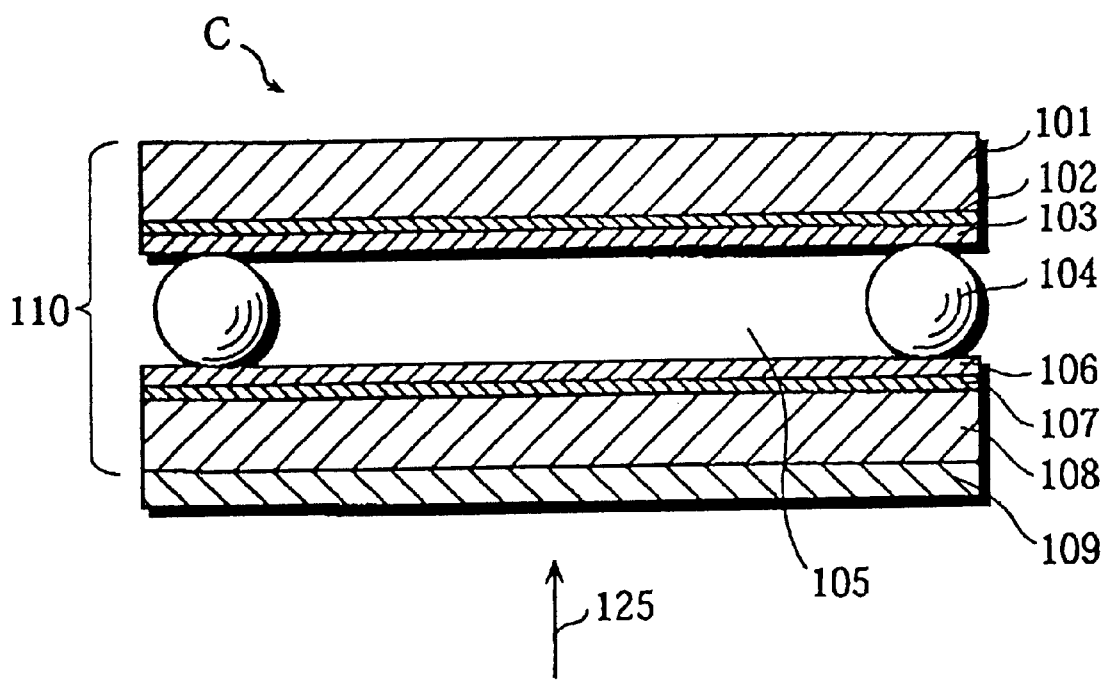
FIG. 18 is a sectional view of a liquid crystal display device C according to a thirteenth embodiment of the invention.

FIG. 18 illustrates a cross section of a liquid crystal display device C according to Embodiment 13 of the invention. The liquid crystal display device C is a light-transmissive type liquid crystal display device made up of a liquid crystal cell 110 and a polarizing plate 109 disposed on the light incoming side of the liquid crystal cell 110, the liquid crystal cell 110 comprising a pair of glass substrates 101, 108 between which a liquid crystal layer 105 is sandwiched. The inner surfaces of the glass substrates 101, 108 are respectively provided with transparent electrodes 102, 107. Disposed on the inner surfaces of the transparent electrodes 102, 107 are alignment films 103, 106. The polarizing plate 109 is arranged such that its polarizing axis is substantially parallel to the direction of the longitudinal axis of the liquid crystal molecules proximate to the interface of the glass substrate 108 which is positioned on the light incoming side.

The liquid crystal cell 110 is a twisted liquid cell in which the liquid crystal molecules of the liquid crystal layer 105 are twisted between the glass substrates 101, 108. In this embodiment, the twist angle ω (see FIG. 19) of the liquid crystal layer 105 is 180°. The liquid crystal layer 105 contains a black dye in addition to a liquid crystal material. The black dye is a dichromatic dye such as an azoxy dye or anthraquinone dye and is of the so-called posi-type which exerts a significant absorbing effect on a light polarized in a direction parallel to the longitudinal axis of liquid crystal molecules and a small absorbing effect on a light polarized in a direction parallel to the lateral axis of liquid crystal molecules. The liquid crystal of the liquid crystal layer 105 is preformed so as to have a chiral pitch of 12 μm by adding a chiral agent. The liquid crystal display device C is designed to keep a gap distance of 6 μm between the substrates by use of spacers 104.

The liquid crystal display device C having the above structure is manufactured by the following fabrication method.

(1) A polyamic acid type polyimide surface alignment agent RN-474 produced by Nissan Chemical Industries Ltd. is applied by spin coating to the two glass substrates 101, 108 having the transparent electrodes 102, 107. The agent is cured at 180° C. over one hour in a thermostatic chamber.

Figure 19:
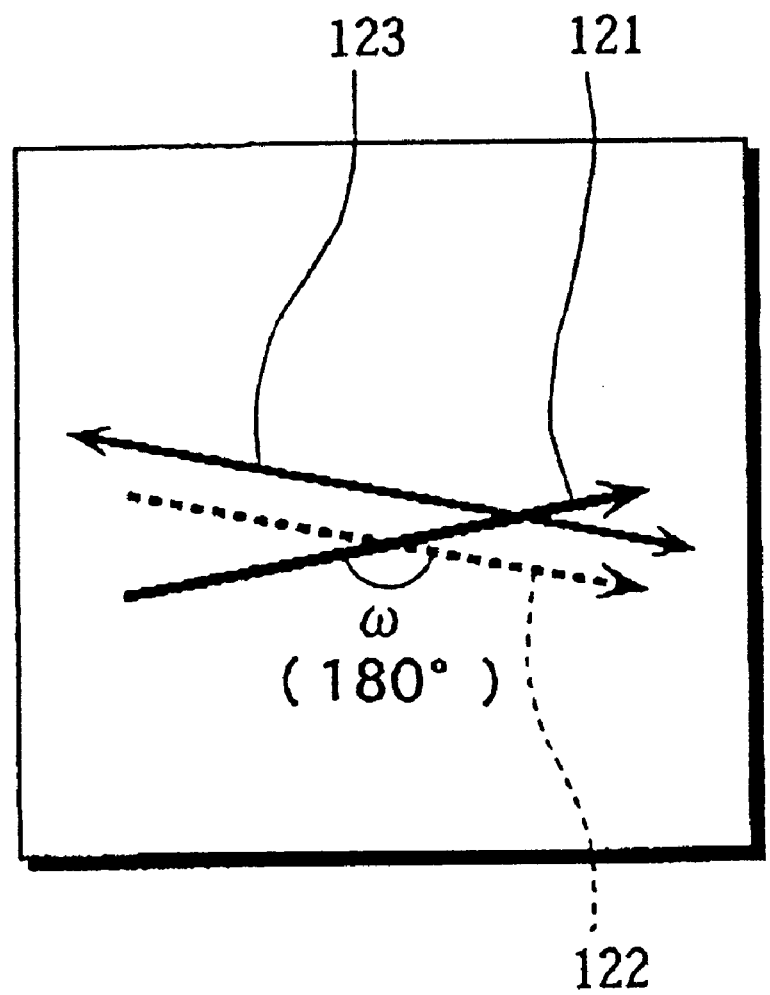
FIG. 19 shows the orientations of optical elements of the liquid crystal display device C according to the thirteenth embodiment.

(2) The coated substrates are rubbed in the direction shown in FIG. 19 using a rayon rubbing cloth. Note that, in FIG. 19, reference numeral 121 designates the rubbing direction of the substrate 101 on the light outgoing side, reference numeral 122 the rubbing direction of the substrate 108 on the light incoming side, and reference numeral 123 the direction of the polarizing axis of the polarizing plate 109. Since the twist angle ω is 180° in Embodiment 13, the rubbing direction 121 of the glass substrate 101 is the same as the rubbing direction 122 of the glass substrate 108.

(3) The glass substrates 101, 108 are bonded such as to produce a gap distance of 6 μm therebetween using the spacers 104 produced by Sekisui Fine Chemical Co., Ltd. and Structbond 352A (the commercial name of a sealing resin produced by Mitsui Toatsu Chemical Co., Ltd.), whereby the vacant liquid crystal cell 110 is prepared.

(4) 100 parts by weight of a positive nematic liquid crystal materials ZLI-2411 commercially available from Merck KGaA (Nematic isotropic transition point (NI point)=65°, anisotropy of refractive index (Δn)=0.140) is mixed with 1 part by weight of a black dye S-466 produced by Mitsubishi Chemical Corporation. Note that the liquid crystal ZLI-2411 contains cholesteryl nonanoate as a left-handed chiral agent and has a chiral pitch of 12 μm. The liquid crystal thus prepared is injected into the vacant, liquid crystal cell 110 placed in an evacuated chamber.

(5) The polarizing plate 109 is bonded to the liquid crystal cell 110 such that the rubbing direction 122 of the glass substrate 108 is coincident with the direction of the polarizing axis 123 of the polarizing plate 109, as shown in FIG. 19.

Figure 20:
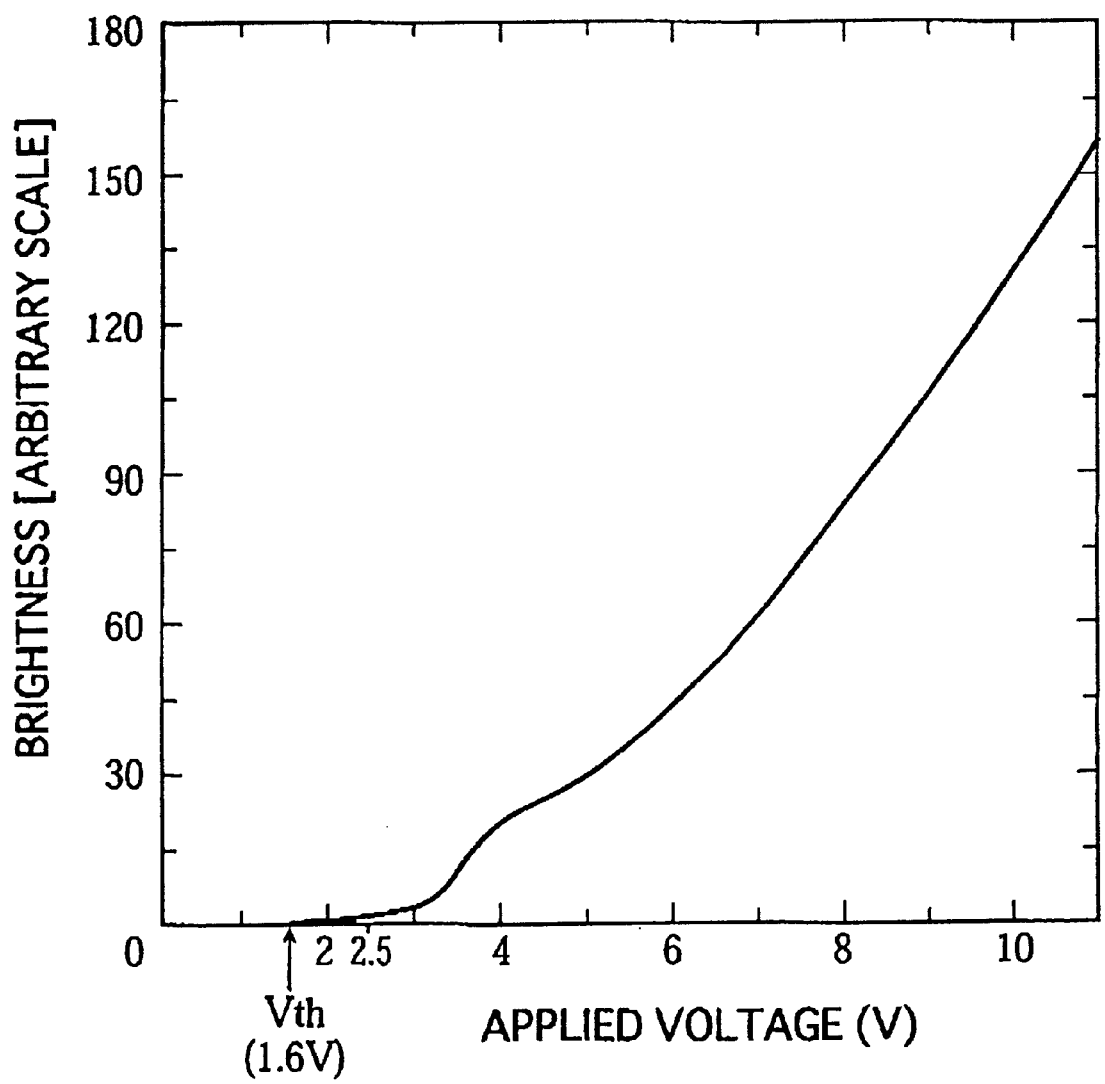
FIG. 20 shows the voltage-transmission characteristic of the liquid crystal display device C according to the thirteenth embodiment.
Figure 21:
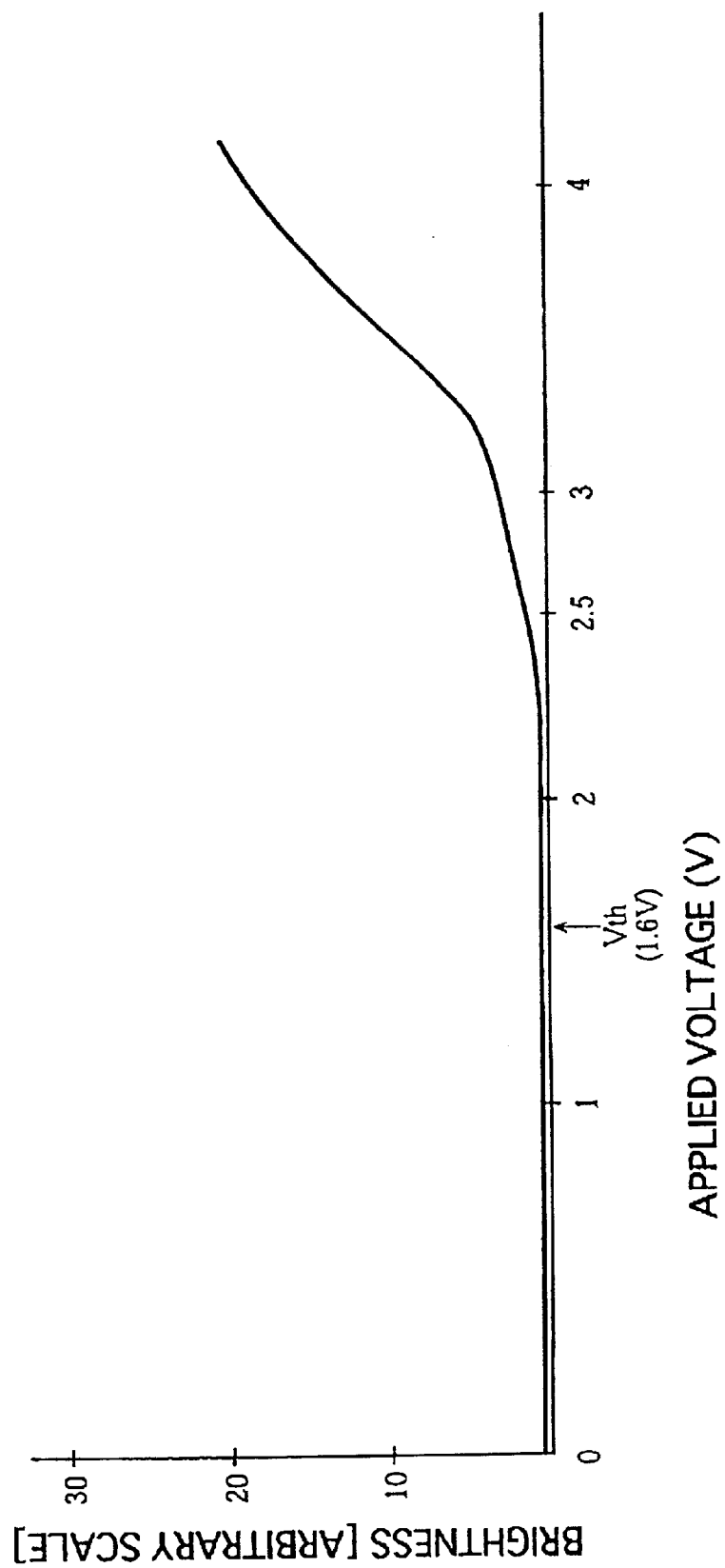
FIG. 21 is a partially enlarged view corresponding to FIG. 20.

The voltage-brightness characteristic of the liquid crystal display device C was measured while a rectangular wave voltage of 30 Hz being applied to it. The result of the measurement is shown in FIGS. 20 and 21. It should be noted that FIG. 21 is a partially enlarged diagram corresponding to FIG. 20. As clearly seen from FIG. 20, the voltage-brightness characteristic of the liquid crystal display device C is outlined as follows: the brightness level is substantially zero when no voltage is applied and is maintained at approximately zero from the time voltage application starts to the time the applied voltage reaches a Freedericksz threshold voltage $V_{th}$. After that, the brightness level increases as the applied voltage increases.

The above voltage-brightness characteristic is attributed to the following fact. When the applied voltage is equal to or less than the Freedericksz threshold $V_{th}$, the liquid crystal molecules are parallel to the substrates and the molecules of the black dye are constrained by the liquid crystal molecules, so that the longitudinal axis of the dye molecules is parallel to the substrates. Therefore, an incident light 125 which has passed through the polarizing plate 109 is mostly absorbed by the black dye so that the brightness level becomes substantially zero. In the range where the applied voltage is equal to or more than the Freedericksz threshold voltage $V_{th}$, the liquid crystal molecules comparatively close to the center of the liquid crystal cell rise vertically relative to the substrates. As the applied voltage increases, the liquid crystal molecules closer to the substrates rise substantially vertically. Under the influence of the movement of the liquid crystal molecules, the dye molecules also vertically rise toward the substrates. This causes a decrease in the light absorption effect of the black dye, so that the level of brightness increases.

According to the voltage-brightness characteristic of the liquid crystal display device C, the level of brightness gently increases with a first gradient just after the voltage applied to the liquid crystal cell 110 exceeds the Freedericksz threshold voltage $V_{th}$, and then it further increases with a second gradient sharper than the first one after the applied voltage exceeds about 2.5V. This is obvious from FIGS. 24 and 25 to be described later. In the first voltage range from the point the applied voltage exceeds the Freedericksz threshold voltage $V_{th}$ to the point the applied voltage reaches 2.5V, a big change is not seen in the tilt angle and orientation of the liquid crystal molecules. After the applied voltage exceeds 2.5V, the tilt angle and orientation vary significantly. Therefore, the molecules of the black dye affected by the movement of the liquid crystal molecules have little fluctuation in the first voltage range and fluctuate considerably after the applied voltage exceeds 2.5V. As a result, the light absorbability of the black dye declines to a large extent in the second stage compared to the prior stage, resulting in a sharp increase in brightness.

The main feature of the liquid crystal display device of this embodiment resides in that image displaying is performed with voltages in the high voltage range which are higher than the turning point, i.e., 2.5V at which brightness changes abruptly in the voltage-brightness characteristic curve. It is confirmed by the following test result that the liquid crystal display device C achieves fast response and a high contrast ratio in gray scale displaying.

We first measured the brightness of display images in the liquid crystal display device C, with the applied voltage ranging from 2.5V to 11.0V and calculated the contrast ratio. As a result, it was confirmed that a contrast ratio of 136:1 was obtained which was good enough for gray scale displaying.

Then, the voltage applied to the liquid crystal display device C was changed from 2.5V to 3.7V, 4.9V, 6.1V, 7.3V, 8.5V, 9.7V and 10.9V sequentially, and the rise time and fall time of each change was measured to obtain the sum of these times. The respective sums for the voltage changes were 43 msec, 39 msec, 37 msec, 35 msec, 35 msec, 30 msec and 30 msec.

The response time of an ordinary liquid crystal display device is known to be as follows: the sum of the rise time and fall time is about 150 msec. when voltage is changed between 2.5V and 3.7V, and is 30 to 40 msec. when voltage is changed between 9.7V and 10.9V. As obvious from the test result, the liquid crystal display device C has excellent response characteristics.

It is well understood from the foregoing description that the liquid crystal display device C can perform gray scale displaying with fast response, when the driving voltage ranges from 2.5V to 10.9V. While this embodiment has been described with a case where images are displayed in 8 tones, the invention is not limited to this and enables high-speed image displaying likewise in cases where display images have more than 8 tones. This is also easily assumed from the above test result.

As described earlier, the liquid crystal display device C of Embodiment 13 has a liquid crystal cell having a twist angle ω of 180° in which a guest-host (GH type) liquid crystal material is injected, and the device C differs from STN liquid crystal display devices in the range of driving voltage and in the way of light propagation. Fast response can be ensured in gray scale displaying like the OCB mode, by employing the above range of driving voltage. Since light transmission is controlled by controlling the light absorption by the black dye, there is no need to provide an optical compensating layer and black hue never fluctuates visually in this embodiment. Accordingly, the liquid crystal display device of this embodiment is, in principle, free from visual color changes while ensuring response as fast as that of the conventional OCB liquid crystal display devices, so that it finds a wide range of applications.

Although a black dye is used in this embodiment, dyes/pigments of other colors may be used according to applications. In cases where a black dye is used, image displaying may be performed with voltages equal to and less then the Freedericksz threshold voltage $V_{th}$ only when black color images are displayed, in order to further decrease the brightness level of black images.

For reference, the arrangement of the polarizing plate will be explained. While the polarizing axis of the polarizing plate is substantially parallel to the longitudinal axis of the liquid crystal molecules in the vicinity of the interfaces of the substrates in this embodiment, it is conceivable that the polarizing axis may be arranged at a certain angle such as 20° or 45° relative to the longitudinal axis. However, such non-parallel arrangement where the polarizing axis and the longitudinal axis of the molecules are not parallel to each other does not obtain a satisfactory black level, which results in poor image quality. The reason for this is as follows. In the high voltage range, the voltage-brightness characteristic in the case of the parallel arrangement where the polarizing axis and the longitudinal axis of the molecules are parallel to each other is, in principle, identical to the voltage-brightness characteristic in the case of the non-parallel arrangement. However, in the low voltage range, the voltage-brightness characteristic in the case of the parallel arrangement differs from that in the case of the non-parallel arrangement. More precisely, where the polarizing axis and the longitudinal axis of the molecules are not parallel, the molecules of the dye are not parallel to the polarizing plate when no voltage is applied and therefore, the absorbed light is small in amount compared to the case of the parallel arrangement, so that brightness remains at a certain level. Even when the applied voltage slightly exceeds the Freedericksz threshold voltage $V_{th}$, brightness is maintained at a level substantially similar to the level at the time of no voltage application. When the applied voltage increases further, the tilt angle and orientation of the liquid crystal molecules have a particular relationship with the orientation of the polarizing plate and as a result, brightness drops drastically. When the applied voltage increases still further, brightness increases in conjunction therewith. Even when brightness is at the lowest level, it is not zero but a level which is not low enough to display black color, and therefore, the liquid crystal display device having the non-parallel arrangement fails in ensuring a satisfactory black level, leading to poor image quality.

A test conducted by us has, however, proved that where the polarizing plate is placed with its polarizing axis being substantially perpendicular to the longitudinal axis of the liquid crystal molecules, the lowest level of brightness is not zero but acceptable for displaying black color. In consideration of this fact, the polarizing axis of the polarizing plate may be arranged substantially perpendicular to the longitudinal axis of the liquid crystal molecules and with such perpendicular arrangement, image displaying may be done with voltages higher than the voltage at which brightness is at the lowest level.

EMBODIMENT 14

Embodiment 14 has the same structure as Embodiment 13 except that while the twist angle ω is 180° In Embodiment 13, the twist angle ω of Embodiment 14 is in the range of from 160° to 200°. With the structure of Embodiment 14, the same inventive effect as that of Embodiment 13 can be obtained. Details will be explained below.

Seven liquid crystal display devices D1 to D7 were fabricated by the same method as that of the liquid crystal display device C of Embodiment 13 except for the following points.

(a) As a liquid crystal material, a positive nematic liquid crystal ZLI-2293 (NI point=85°, Δn=0.140) produced by Merck KGaA and containing 1 wt % of a black dye S-466 (produced by Mitsubishi Chemical Corporation) is used.

(b) The thickness of the liquid crystal layer is 5 μm and the chiral pitch is 10 μm.

(c) The twist angle ω of the liquid crystal of each device differs from that of Embodiment 13. As seen from Table 5, the twist angles ω of the liquid crystal display devices D1 to D7 are 150°, 160°, 170°, 180°, 190°, 200°, and 210°, respectively.

TABLE 5

| liquid crystal display device | twist angle of liquid crystal |
|---|---|
| D1 | 150 |
| D2 | 160 |
| D3 | 170 |
| D4 | 180 |
| D5 | 190 |
| D6 | 200 |
| D7 | 210 |

The following test was conducted to measure the response of each of the liquid crystal display devices D1 to D7. Concretely, the range of driving voltage (V1–V2) for each device was determined as shown in Table 6. For evaluating the response of each device, the response times when the applied voltage was changed from V1 to V2 and when it was changed from V2 to V1 were respectively measured, and then the sum of these response times was obtained. Table 7 shows the test result. It should be noted that V1 is the applied voltage when the gradient of the voltage-brightness characteristic abruptly changes in each of the liquid crystal display devices D1 to D7.

TABLE 6

| liquid crystal display device | V1 (V) | V2 (V) |
|---|---|---|
| D1 | 2.2 | 3.1 |
| D2 | 2.3 | 3.2 |
| D3 | 2.4 | 3.3 |

TABLE 6-continued

| liquid crystal display device | V1 (V) | V2 (V) |
|---|---|---|
| D4 | 2.5 | 3.4 |
| D5 | 2.6 | 3.5 |
| D6 | 2.7 | 3.6 |
| D7 | 2.8 | 3.7 |

TABLE 7

| liquid crystal display device | response time (msec) |
|---|---|
| D1 | 52 |
| D2 | 35 |
| D3 | 33 |
| D4 | 31 |
| D5 | 31 |
| D6 | 35 |
| D7 | 57 |

As seen from Table 7, while the liquid crystal display device D1, D7 exhibit poor response as their response times are more than 50 msec., the display devices D2, D3, D4, D5, D6 exhibit rapid response as their respective response times are less than 40 msec. It is understood from the result that the twist angle, which permits rapid response, ranges from 160° to 200°.

The reason why rapid response can be obtained when the twist angle falls in the range of from 160° to 200° is as follows. It is widely known that, in a liquid crystal display device having a twisted liquid crystal cell and a polarizing plate, the response is dependent of the angle between the twisted liquid crystal molecules and the polarizing plate and becomes fast when this angle falls in a certain range. Under the condition that the polarizing plate is disposed with its polarizing axis being parallel to the liquid crystal molecules in the interface of the substrate 108 on the light incoming side, the twist angle for obtaining fast response falls in the range of from 160° to 200°. Accordingly, if the twist angle ranges from 160° to 200°, the degree to which the movement of the liquid crystal molecules is prevented by the backflow caused by actuation can be restricted as much as possible so that response as fast as that of the OCB mode can be achieved.

Regarding the liquid crystal display devices D2, D4, D5, D6 of this embodiment, the viewing angle dependence of hues were checked at various brightness levels. These devices were found to be virtually free from hue shifts so that their usefulness was proved.

Although the chiral pitch of the liquid crystal material is set to be twice the thickness of the liquid crystal layer in this embodiment, the preferable range of the chiral pitch is one to three times the thickness of the liquid crystal layer. The reason for this is that if the chiral pitch is smaller than the thickness of the liquid crystal layer, the twist angle of the liquid crystal layer becomes larger than the desired value by 180° and if the chiral pitch is more than three times the thickness of the liquid crystal layer, the condition of the director alignment tends to be instable.

EMBODIMENT 15

Figure 22:
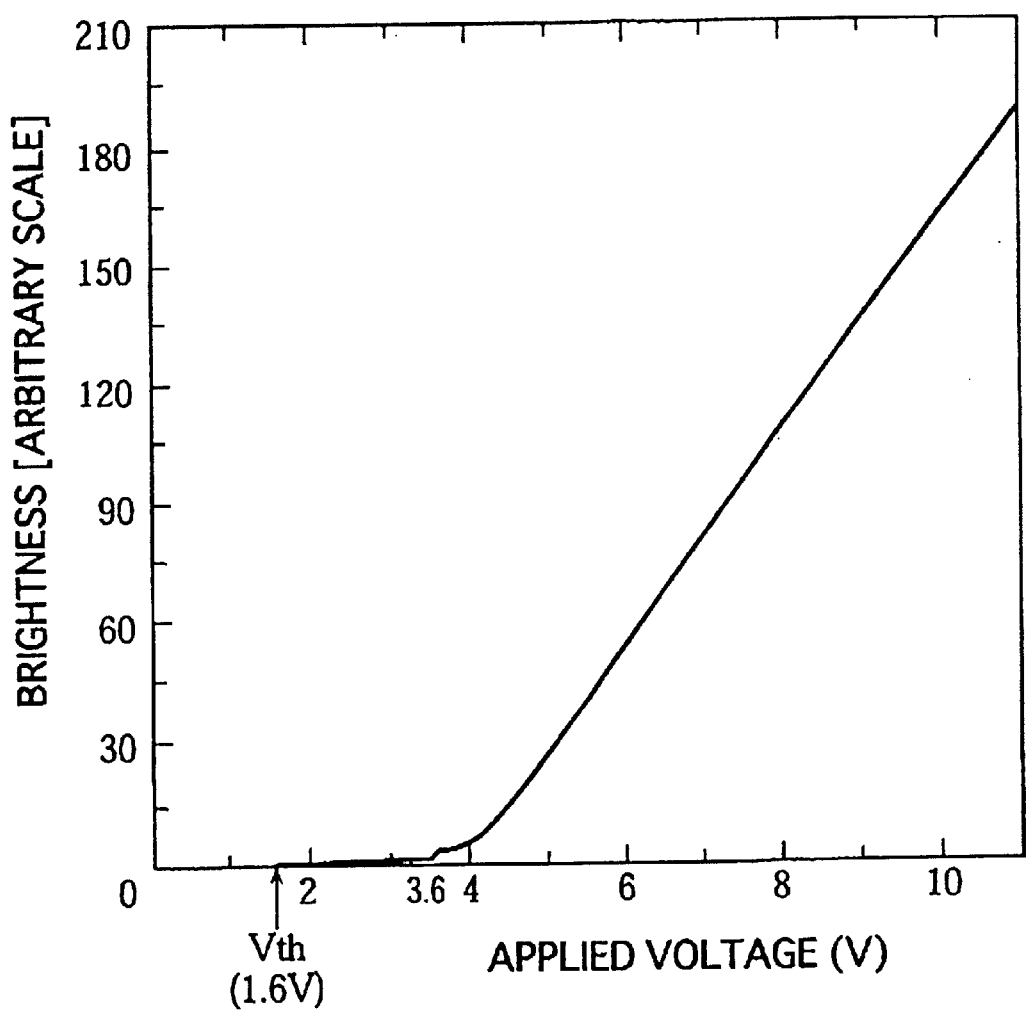
FIG. 22 shows the voltage-transmission characteristic of a liquid crystal display device E4 according to a fifteenth embodiment of the invention.
Figure 23:
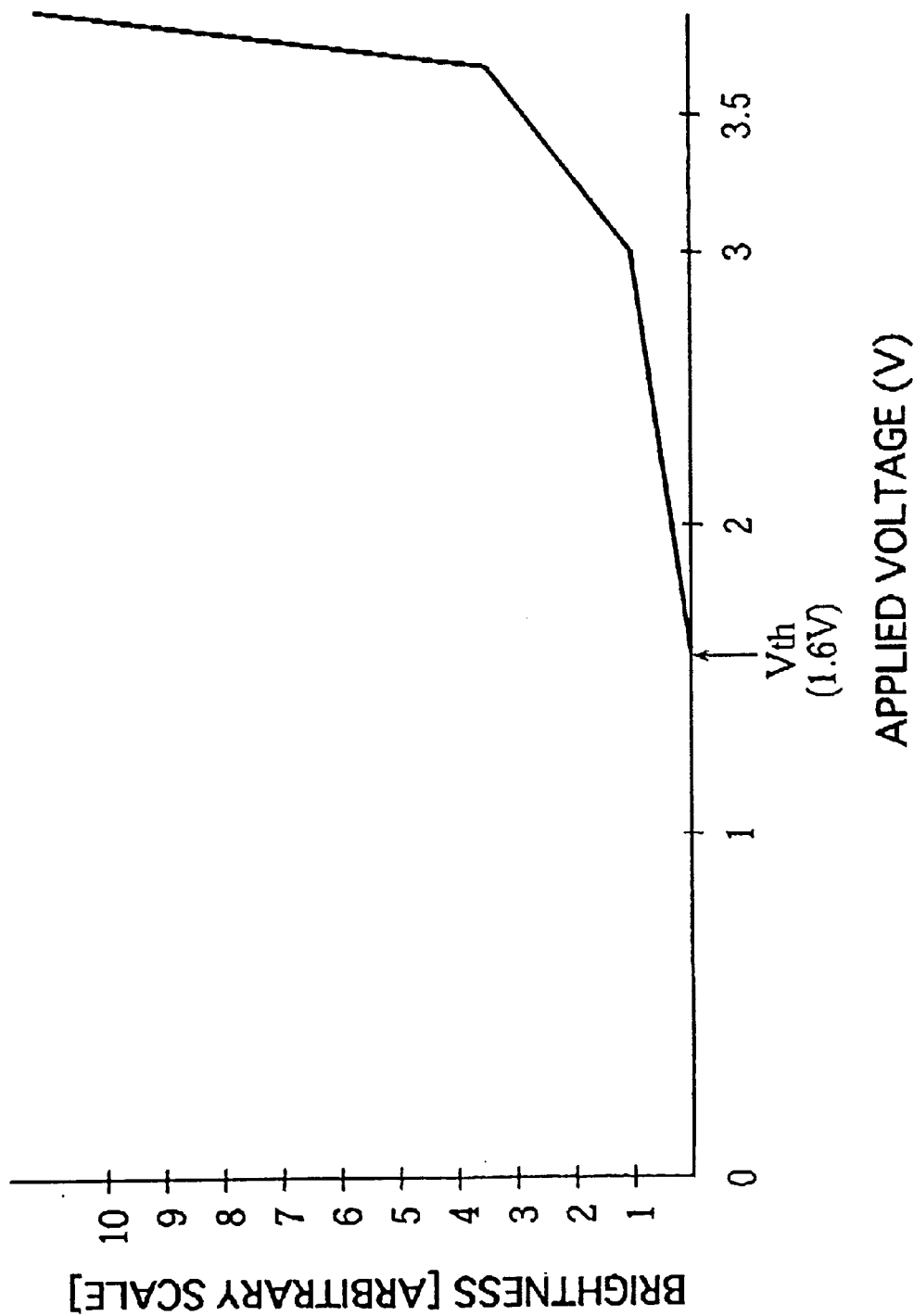
FIG. 23 is a partially enlarged view corresponding to FIG. 22.

The liquid crystal display device of Embodiment 15 has the same structure as that of the liquid crystal display device D of Embodiment 14 except that the twist angle ω of the liquid crystal of Embodiment 14 ranges from 160° to 200°, whereas the twist angle ω of Embodiment 15 ranges from 250° to 290°. FIGS. 22 and 23 show the voltage-brightness characteristic of a liquid crystal display device E4 having a twist angle ω of 270°, which is a typical example of Embodiment 15. Note that FIG. 23 is a partially enlarged view corresponding to FIG. 22.

It is obvious from FIGS. 22, 23 that the voltage-brightness characteristic of the liquid crystal display device E of this embodiment is essentially identical to that of the liquid crystal display device C having a twist angle ω of 180°. One of the features of Embodiment 15 resides in that image displaying is performed, similarly to Embodiments 13, 14, with driving voltages higher than the point (=3.6V on the curves shown in FIGS. 22, 23) at which the gradient of the voltage-brightness characteristic curve abruptly changes. It has been experimentally verified by the test described below that fast response and a high contrast ratio in gray scale displaying can be achieved in this embodiment. The test will be concretely described.

Seven liquid crystal display devices E1 to E7 were fabricated by the fabrication method that was similar to that of the liquid crystal display device C of Embodiment 13 except for the following points. In Embodiment 15, a positive nematic liquid crystal ZLI-2293 (NI point=85°, Δn=0.140) produced by Merck KGaA containing 1 wt % of a black dye S-466 produced by Mitsubishi Chemical Corporation is used as the liquid crystal material. The thickness of the liquid crystal layer is 20 μm, and the chiral pitch is 24 μm. Twist angles ω different from that of embodiment 13 are adapted. Specifically, the twist angles of the liquid crystals in the liquid crystal display device E1 to E7 are, as shown in Table 8, 240°, 250°, 260°, 270°, 280°, 290°, and 300°, respectively.

TABLE 8

| liquid crystal display device | twist angle of liquid crystal |
|---|---|
| E1 | 240 |
| E2 | 250 |
| E3 | 260 |
| E4 | 270 |
| E5 | 280 |
| E6 | 290 |
| E7 | 300 |

The range of applied voltage (V1–V2) for each of the display devices E1 to E7 is determined as shown in Table 9. Table 10 shows the sum of the response times when the applied voltage is changed from V1 to V2 and when it is changed vice versa in each device. It should be noted V1 is the applied voltage when the gradient of the voltage-brightness characteristic abruptly changes in each of the liquid crystal display devices E1 to E7.

TABLE 9

| liquid crystal display device | V1 (V) | V2 (V) |
|---|---|---|
| E1 | 3.2 | 3.9 |
| E2 | 3.3 | 4.0 |
| E3 | 3.4 | 4.1 |
| E4 | 3.5 | 4.2 |

TABLE 9-continued

| liquid crystal display device | V1 (V) | V2 (V) |
|---|---|---|
| E5 | 3.6 | 4.3 |
| E6 | 3.7 | 4.4 |
| E7 | 3.8 | 4.5 |

TABLE 10

| liquid crystal display device | response time (msec) | contrast ratio |
|---|---|---|
| E1 | 69 | 70:1 |
| E2 | 50 | 120:1 |
| E3 | 43 | 170:1 |
| E4 | 37 | 196:1 |
| E5 | 44 | 180:1 |
| E6 | 48 | 135:1 |
| E7 | 62 | 85:1 |

The twist angle and the thickness of the liquid crystal layer of Embodiment 15 are large. Therefore, as seen from Table 10, Embodiment 15 is somewhat poor in response characteristics compared to Embodiment 14, but acceptable for practical use. Further, when image displaying is performed with voltages higher than those shown in Table 9, substantially similar response characteristics can be obtained in operation for changing applied voltage between two levels corresponding two halftones which have a slight difference in brightness.

For the liquid crystal display device E4, the contrast ratio was defined as the ratio of the brightness when 11.0V was applied to the brightness when 3.0V was applied. The value of this contrast ratio was found to be 196. For other liquid crystal display devices E1 to E3 and E5 to E7, the contrast ratio was likewise defined and their respective values were obtained. Table 10 demonstrates the contrast ratio of each device. As seen from Table 10, a contrast and response characteristics good enough for practical use can be obtained with a twist angle ranging from 250° to 290°. The response when the twist angle is in the range of from 250° to 290° is better than those when it is 240° and when it is 300° for the same reason that the twist angle ranging from 160° to 200° achieves good response. A high contract can be obtained when the twist angle is in the range of from 250° to 290° for the following reason. Where the twist angle exceeds 290°, the twist angle is so large that the light propagation within the liquid crystal layer cannot follow the twist, which entails a loss of light and, in consequence, a poor contrast.

The viewing angle dependence of hues at various brightness levels was observed in the liquid crystal display devices E2 to E6 and virtually no hue fluctuation was observed. This proves the usefulness of these display devices E2 to E6.

While the chiral pitch of the liquid crystal material in this embodiment is 1.2 times the thickness of the liquid crystal layer, the preferable range may be one to twice the thickness of the liquid crystal layer. The reason for this is that if the chiral pitch is smaller than the thickness of the liquid crystal layer, the twist angle of the liquid crystal layer becomes 180° larger than the desired value and if the chiral pitch is more than twice the thickness of the liquid crystal layer, the twist angle of the liquid crystal layer becomes 180° smaller than the desired value.

EMBODIMENT 16

While Embodiments 13 to 15 determine the range of driving voltage for the liquid crystal display device from the voltage-brightness characteristic, this range is determined from the average tilt angle of the liquid crystal molecules in Embodiment 16. Brightness usually varies according to the variation of the voltage applied to the liquid crystal display device and this fact is attributable to changes in the tilt angle of dye molecules following changes in the tilt angle of the liquid crystal molecules. For this reason, the range of driving voltage may be determined not only from the voltage-brightness characteristic but also from the average tilt angle of the liquid crystal molecules. This embodiment provides one example in which the range of driving voltage for the liquid crystal display device is determined from the average tilt angle of the liquid crystal molecules.

Figure 24:
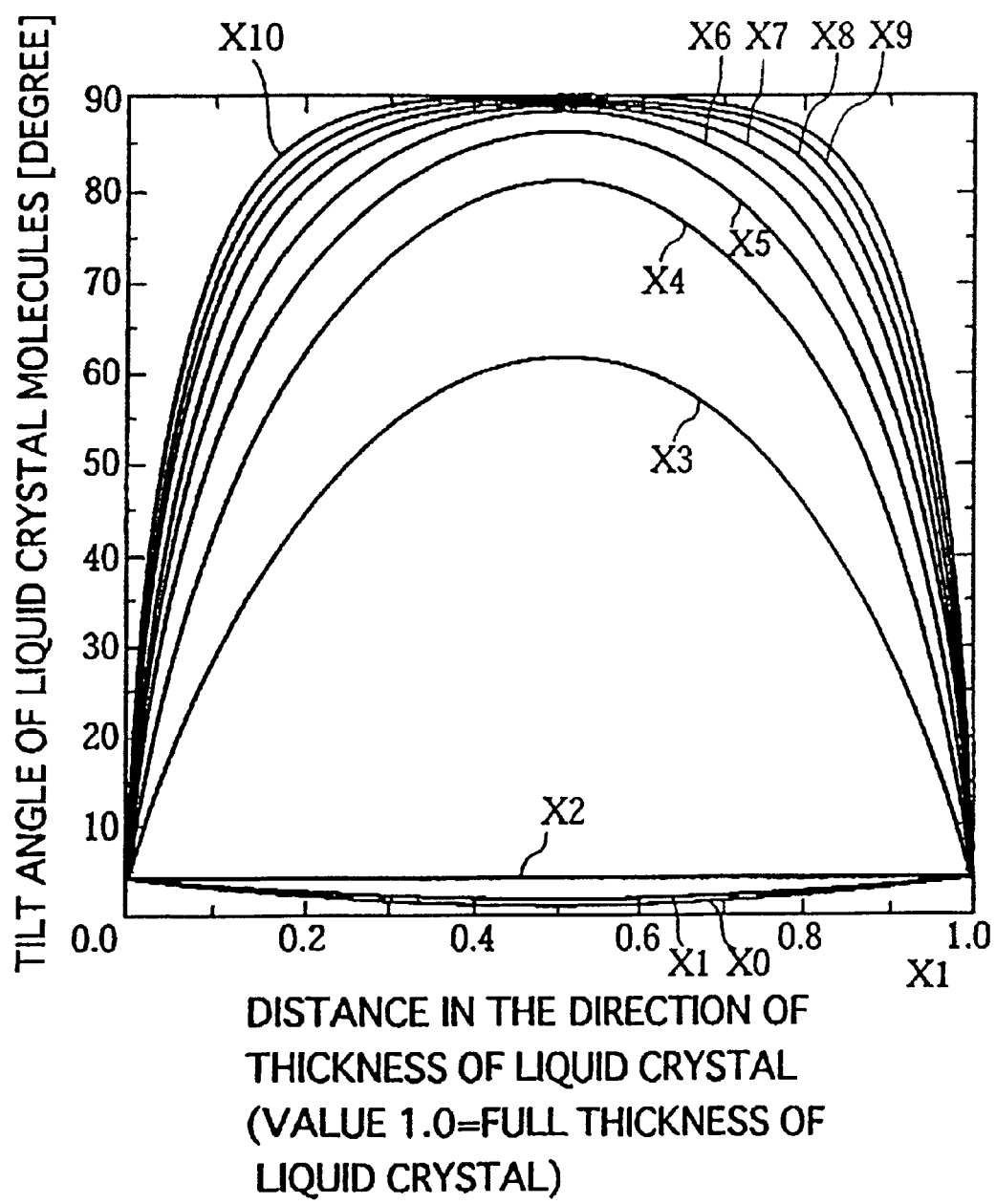
FIG. 24 shows the tilt angle of directors in the liquid crystal display device C, the tilt angle being obtained from simulation.
Figure 25:
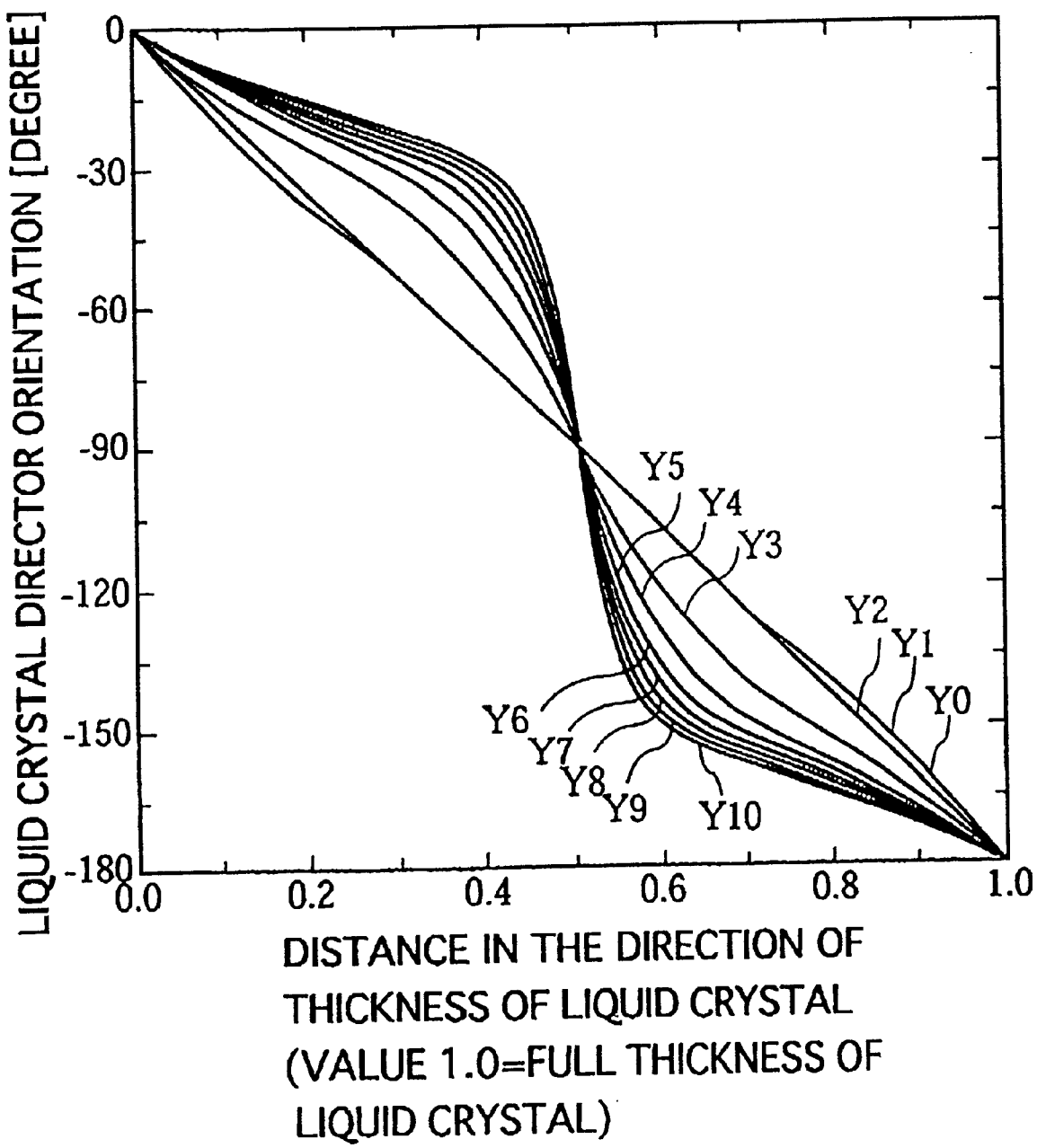
FIG. 25 shows the orientation of directors in the liquid crystal display device C, the orientation being obtained from simulation.

This embodiment will be concretely explained. The director distribution of the liquid crystal display device C of Embodiment 13 was calculated. The applied voltage was varied by 1V from 0V to 10V. FIGS. 24 to 25 show the result of the test. Note that FIG. 24 shows the tilt angle of the liquid crystal molecules in relation to the substrate plane, whereas FIG. 25 shows the orientation of director alignment. In FIG. 24, line X0 represents a case where a voltage of 0V was applied. Similarly, lines X1, X2, X3, X4, X5, X6, X7, X8, X9 and X10 represent cases where the applied voltage was 1V, 2V, 3V, 4V, 5V, 6V, 7V, 8V, 9V and 10V, respectively. Referring to FIG. 25, line Y0 represents a case where the applied voltage was 0V, and likewise, lines Y1, Y2, Y3, Y4, Y5, Y6, Y7, Y8, Y9 and Y10 represent cases where the applied voltage was 1V, 2V, 3V, 4V, 5V, 6V, 7V, 8V, 9V and 10V, respectively.

Figure 26:
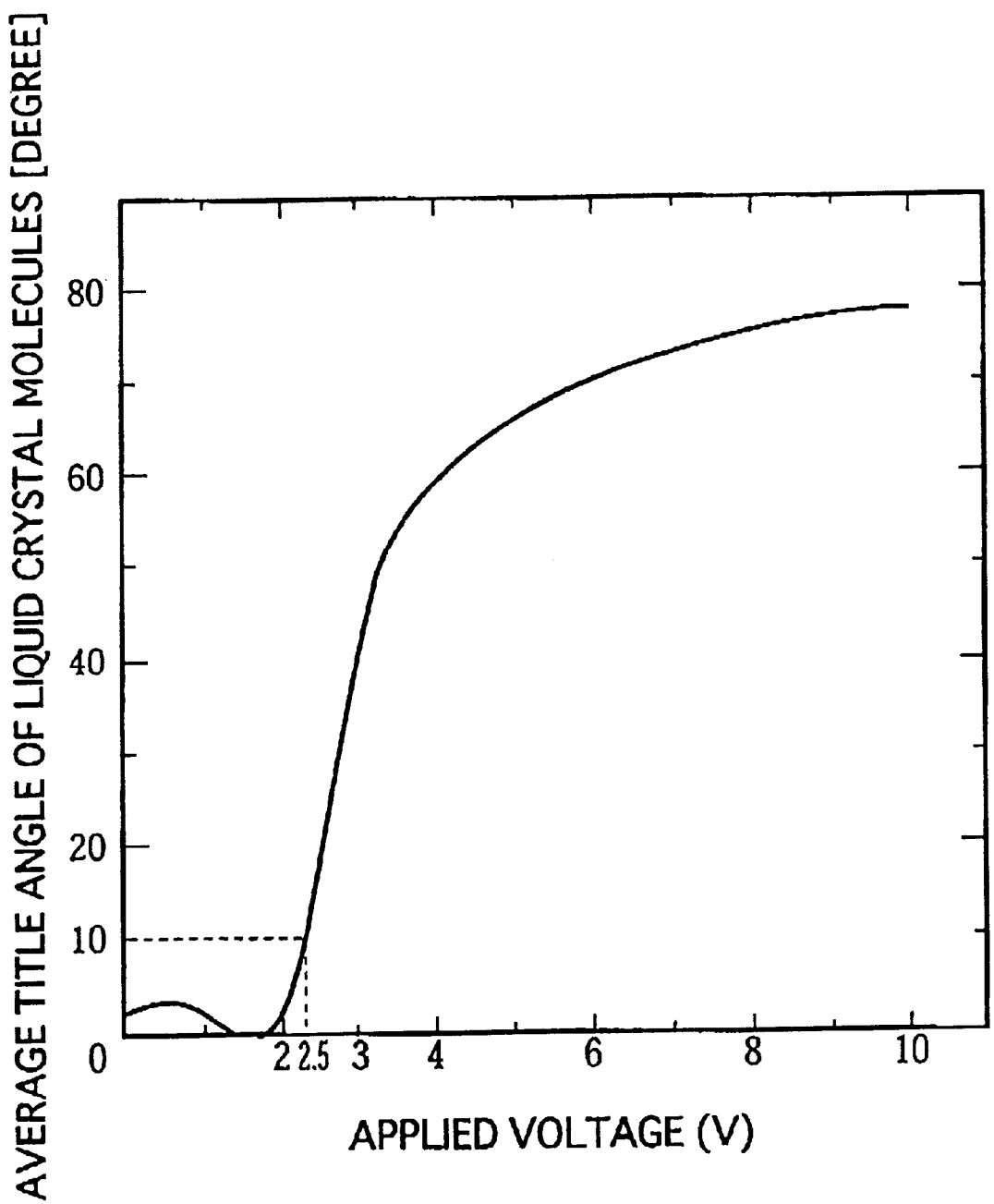
FIG. 26 shows the relationship between the tilt angle of directors and applied voltage in the liquid crystal display device C.

It is understood from FIGS. 24, 25 that the tilt angle of the liquid crystal molecules and the orientation of director alignment change slightly when the applied voltage was up to 2V, and change greatly when the applied voltage was equal to or more than 3V. It is conceivable that due to the changes in the tilt angle and the director alignment orientation, which correspond to changes in the applied voltage, the gradient of brightness levels largely changes in the vicinity of 2.5V in the voltage-brightness characteristic of the liquid crystal display device C (see FIG. 21). Accordingly, the same range of applied voltage determined by the voltage-brightness characteristic can be obtained through determination using the average tilt angle of the liquid crystal molecules. We calculated the average tilt angle of the liquid crystal molecules for each value of applied voltage. FIG. 26 shows the result. It is understood from FIGS. 20, 26 that the average tilt angle of the liquid crystal molecules corresponding to an applied voltage of 2.5V is 10°. Thus, in a liquid crystal display device having a twist angle ranging from 160° to 200°, image displaying is possibly carried out when the average tilt angle of the liquid crystal molecules is 10° or more. When the average tilt angle is less than 10°, neither satisfactory brightness nor a practicable contrast ratio can be obtained.

EMBODIMENT 17

While Embodiment 16 determines the range of driving voltage from the average tilt angle in the liquid crystal display device whose twist angle ω ranges from 160° to 200°, Embodiment 17 carries out the driving voltage range determination with the average tilt angle in the liquid crystal display device whose twist angle ω ranges from 250° to 290°. It was experimentally proven that Embodiment 17 had the same inventive effect of Embodiment 16.

Figure 27:
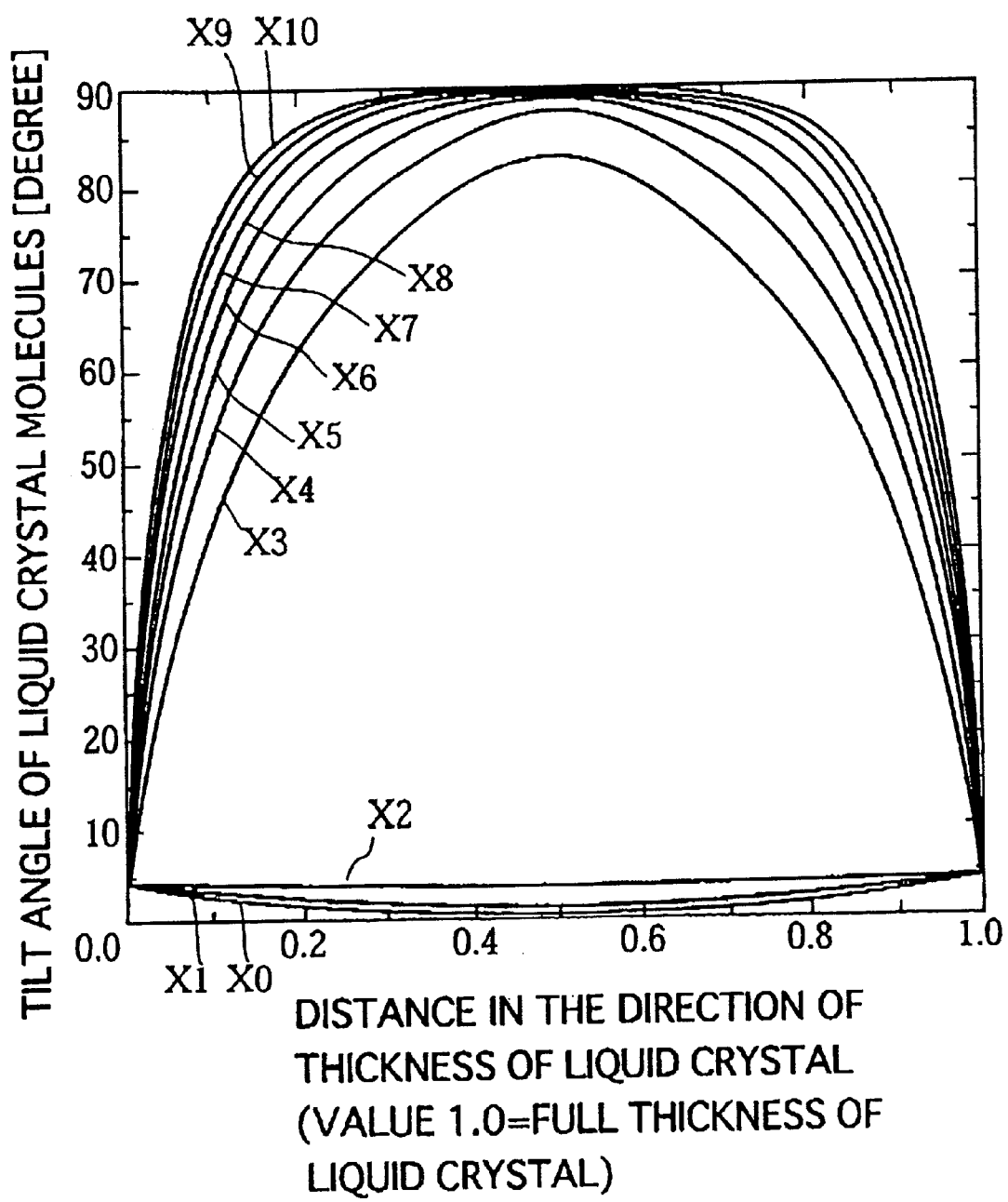
FIG. 27 shows the tilt angle of directors in the liquid crystal display device E4, the tilt angle being obtained from simulation.
Figure 28:
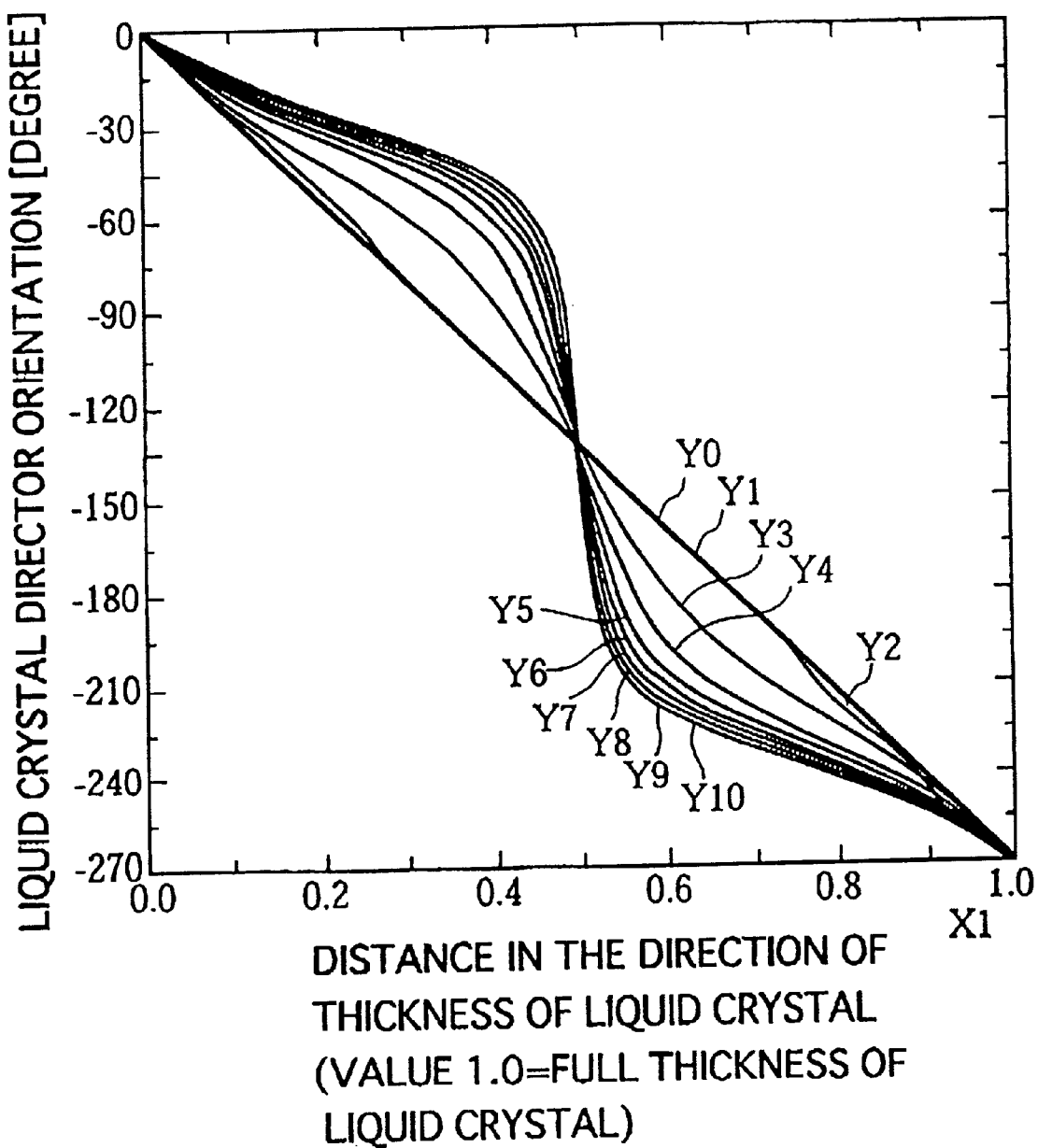
FIG. 28 shows the orientation of directors in the liquid crystal display device E4, the orientation being obtained from simulation.
Figure 29:
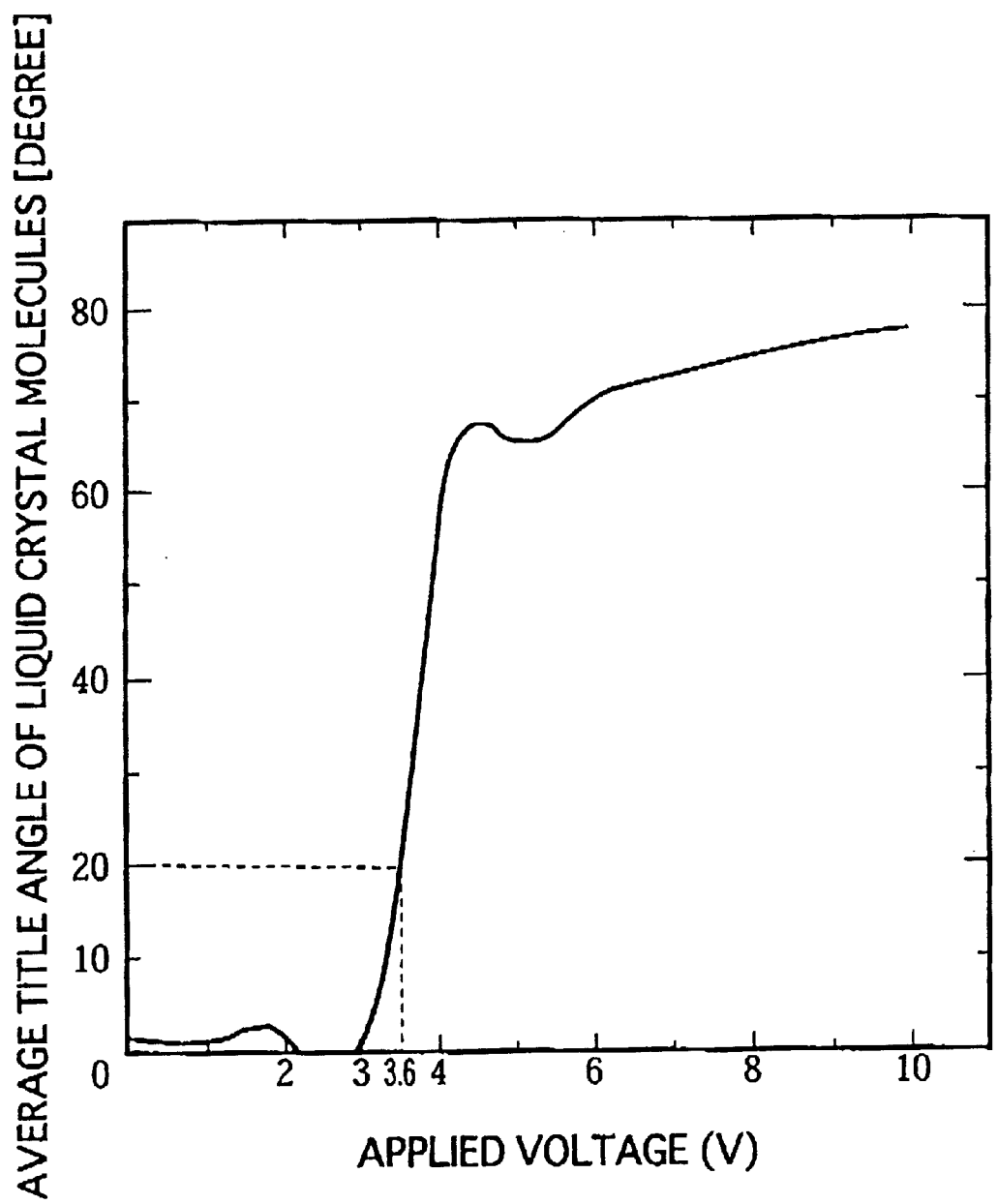
FIG. 29 shows the relationship between the tilt angle of directors and applied voltage in the liquid crystal display device E4.

This embodiment will be concretely explained. The director configuration of the liquid crystal display device E4 prepared according to Embodiment 15 was obtained through calculation, while the applied voltage being changed by 1V from 0 to 10V. FIGS. 27 and 28 show the result of the calculation for each voltage value. FIG. 27 shows the tilt angle of the liquid crystal molecules relative to the substrate plane, whereas FIG. 28 shows the orientation of director alignment. FIG. 29 shows the average tilt angle of the liquid crystal molecules corresponding to each applied voltage value. It is understood from FIGS. 22, 29 that the average tilt angle of the liquid crystal molecules corresponding to an applied voltage of 3.6V is 20°. Accordingly, in the case of the liquid crystal display device whose twist angle is 250° to 290°, image displaying is possible when the average tilt angle of the liquid crystal molecules is 20° or more. When the average tilt angle is less than 20°, satisfactory black color displaying cannot be performed, and a practicable contrast ratio cannot be obtained.

EMBODIMENT 18

While Embodiments 13 to 17 use a twisted liquid crystal cell, Embodiment 18 is characterized by a splay liquid crystal cell having a twist angle ω of 0°. The liquid crystal display device F of Embodiment 18 has the same structure as the liquid crystal display device C of Embodiment 13, except that the liquid crystal display device F has a liquid crystal cell formed by adding a black dye in the conventional OCB mode liquid crystal cell and that the polarizing plate is disposed with its polarizing axis being substantially parallel to the rubbing direction of the substrates. Another difference is that the liquid crystal display device F does not incorporate the birefringence mode employed in the conventional OCB liquid crystal display devices but utilizes the Guest-host mode. The liquid crystal display device F of Embodiment 18 is fabricated in the following method.

(1) A prepolymerized type polyimide surface alignment agent AL-5062 produced by Japan Synthetic Rubber Co., Ltd. is applied by spin coating to the two glass substrates 101, 108 having the transparent electrodes 102, 107, and then cured at 180° over one hour within a thermostatic chamber.

Figure 30:
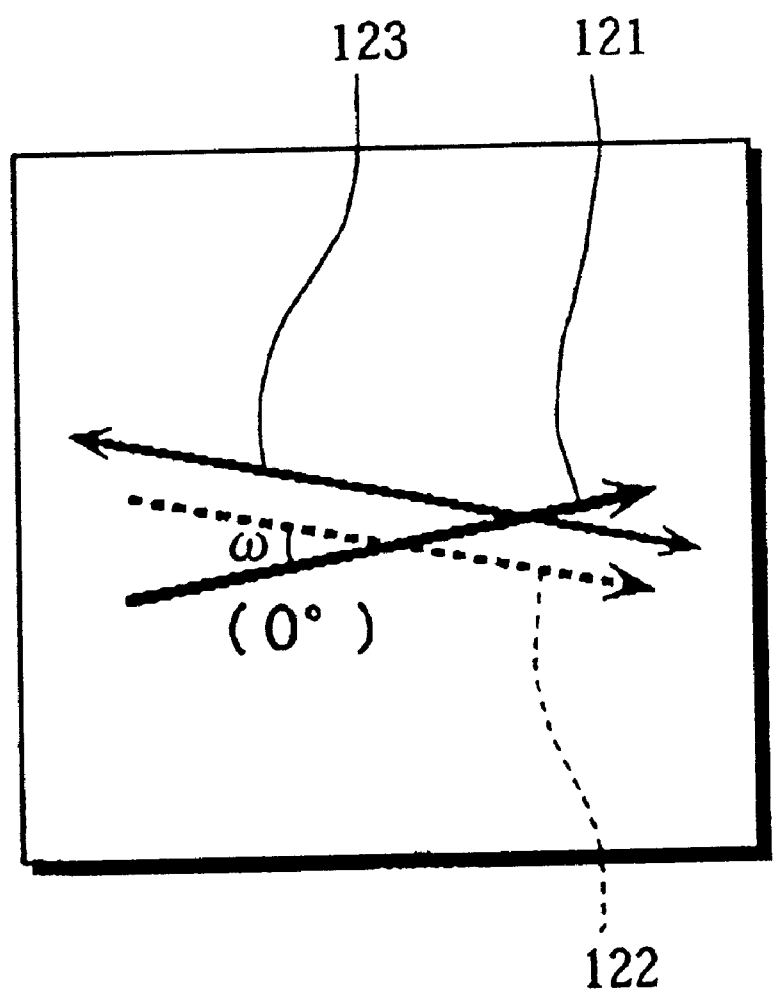
FIG. 30 shows the orientations of optical elements of a liquid crystal display device F according to an eighteenth embodiment of the invention.

(2) Then, the surfaces of the coated substrates are rubbed in the direction shown in FIG. 30, using a rayon rubbing cloth. Referring to FIG. 30, reference numeral 121 represents the rubbing direction of the substrate 101 positioned on the light outgoing side, reference numeral 122 the rubbing direction of the substrate 108 positioned on the light incoming side, and reference numeral 123 the direction of the polarizing axis of the polarizing plate 109. In Embodiment 18, the rubbing direction 121 of the substrate 101 is the same as the rubbing direction 122 of the glass substrate 108 in order to produce a twist angle ω of 0°.

(3) The substrates 101, 108 are bonded so as to have a gap distance of 14 μm therebetween by use of the spacers 104 produced by Sekisui Fine Chemical Co., Ltd. and Structbond 352A (sealing resin) produced by Mitsui Toatsu Chemical Co., Ltd., whereby the vacant liquid crystal cell 110 is formed.

(4) 100 parts by weight of a positive nematic liquid crystal LIXON-5052 (NI point=104°, Δn=0.102) produced by Chisso Corporation and containing no chiral agent and 1 part by weight of a black dye S-466 produced by Mitsubishi Chemical Corporation are injected in the vacant liquid crystal cell 110 placed in an evacuated chamber.

(5) The polarizing plate 109 is bonded to the liquid crystal cell 110 such that the rubbing directions 121, 122 of the substrates coincide with the direction 123 of the polarizing axis of the polarizing plate as shown in FIG. 30, thereby fabricating the liquid crystal display device F.

Figure 31:
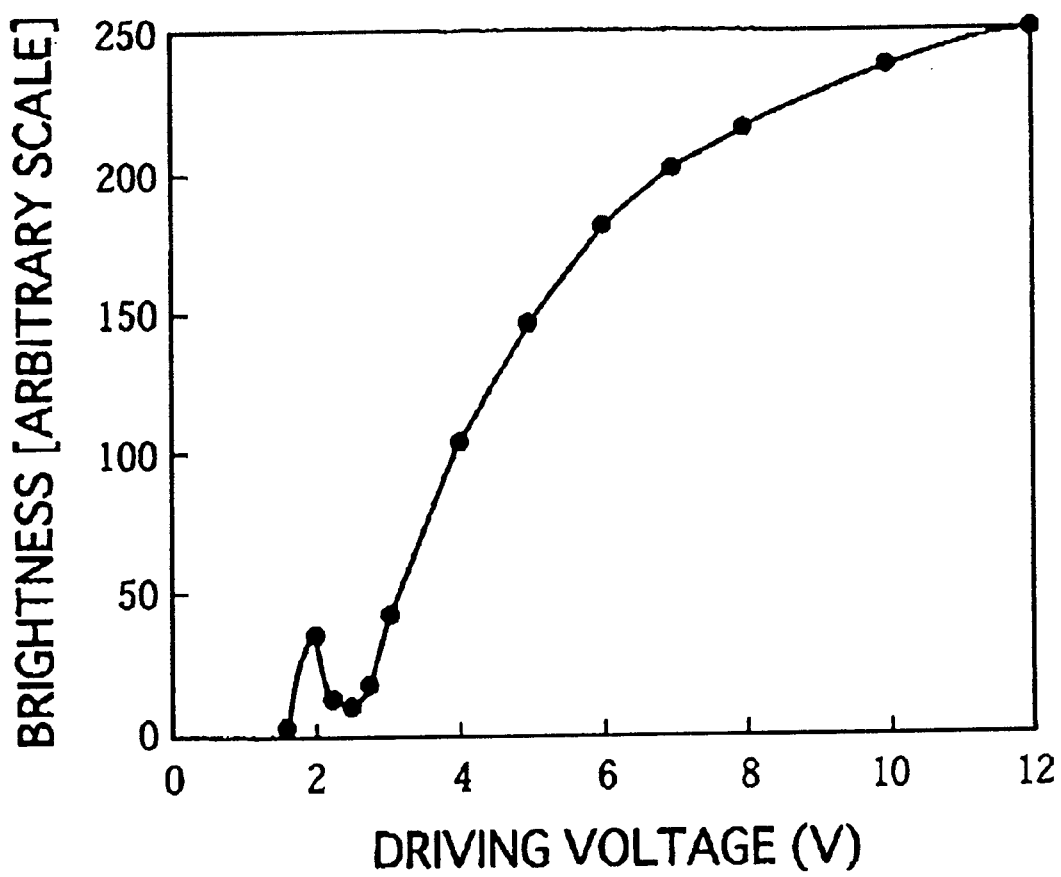
FIG. 31 shows the voltage-brightness characteristic of the liquid crystal display device F according to the eighteenth embodiment.

The voltage-brightness characteristic of the liquid crystal display device F thus fabricated was measured by a known method while a rectangular wave voltage of 30 Hz being applied to it. The result of the measurement is shown in FIG. 31. When no voltage was applied, the director alignment of the liquid crystal layer was in the splay alignment state, but when the applied voltage was in the vicinity of about 2.3V, the director alignment was brought into the bend alignment state. Referring to FIG. 31, when image displaying was done with a driving voltage of 1.8V to 12V, the contrast ratio was 80:1. The sum of the rise time and fall time when the voltage was changed from 2.3V to 2.8V was 30 msec.

Figure 32:
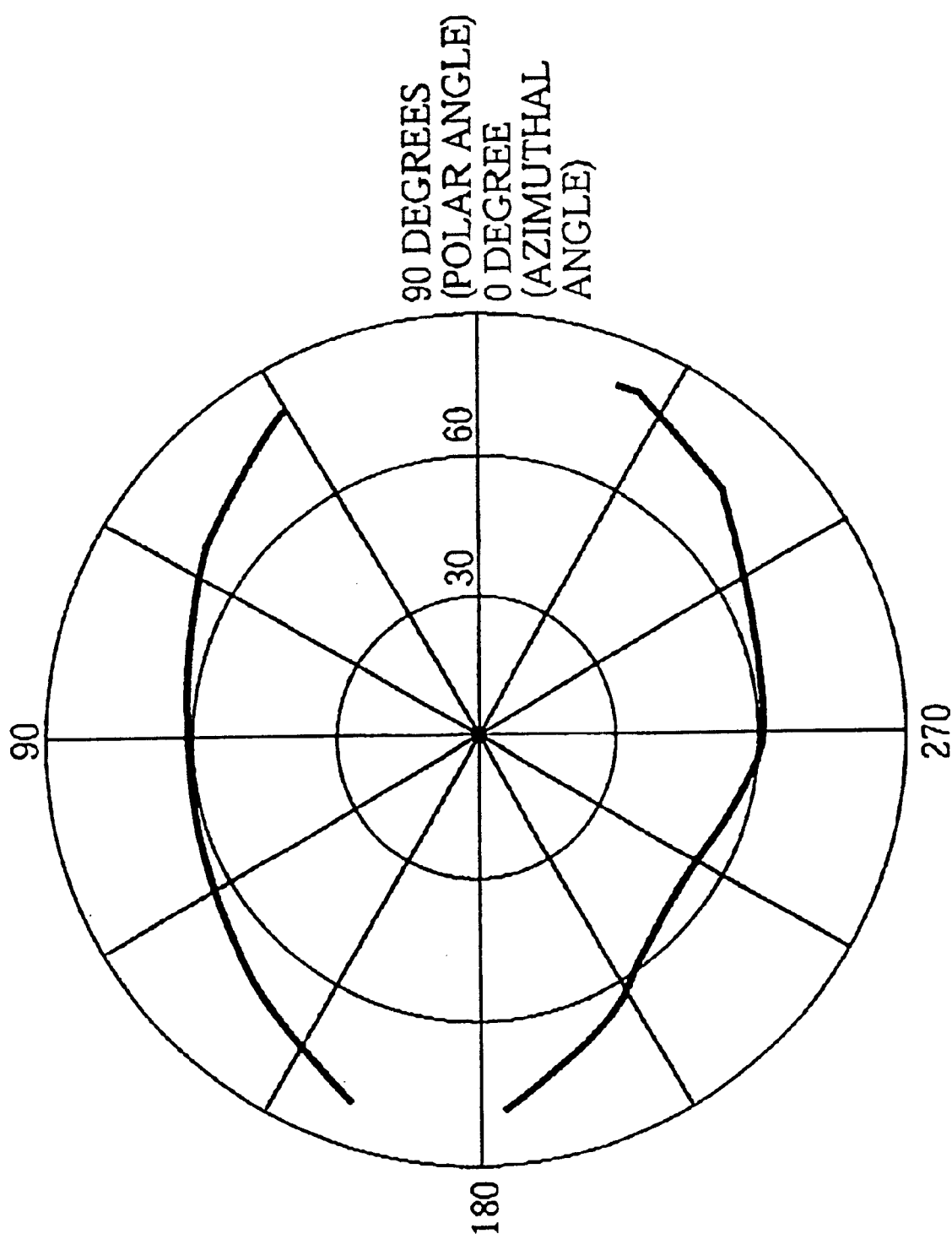
FIG. 32 shows the viewing angle characteristics of the liquid crystal display device F according to the eighteenth embodiment.

FIG. 32 shows the range of viewing angles when the brightness ratio (i.e., contrast ratio) is more than 5:1 with driving voltages of 10V and 1.8V. As seen from FIG. 32, the liquid crystal display device F of this embodiment has good viewing angle characteristics, providing a viewing angle of more than 120° in a vertical direction and a viewing angle of 160° in a lateral direction. Therefore, the liquid crystal display device F proved itself very valuable in practical use. When checking the viewing angle dependence of the displaying characteristics during actuation of the liquid crystal display device F with driving voltages ranging from 2V to 8V, gray scale inversion was not recognized.

As has been described above, Embodiment 18 uses a splay liquid crystal cell in which the liquid crystal layer can be brought into the bend alignment state by voltage application and uses a dye contained in the liquid crystal layer, so that it presents several advantages. First, it ensures fast response equal to that of the OCB mode as well as good viewing angle characteristics. Second, it overcomes the viewing angle dependence of the hues of display images that has been one of the outstanding problems suffered by the conventional OCB liquid crystal display devices employing the birefringence mode. In addition, since the device F is not the birefringence mode, there is no need to include a phase compensator layer.

Although voltages equal to and lower then the Freedericksz threshold voltage are applied only when displaying black-color images in this embodiment, black-color displaying may be done with voltages higher than 2.3V (see FIG. 31) if there is not strong requirement for a high contrast.

EMBODIMENT 19

Figure 33:
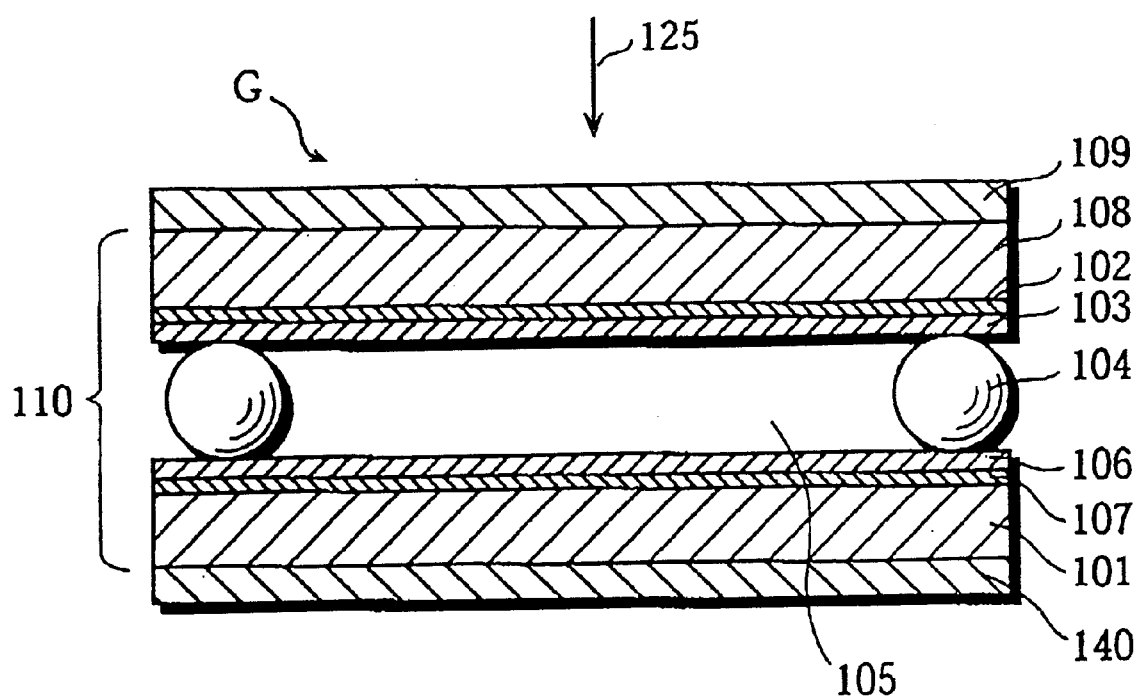
FIG. 33 is a sectional view of a liquid crystal display device G according to a nineteenth embodiment of the invention.

FIG. 33 shows a cross section of a liquid crystal display device according to Embodiment 19 of the invention. The liquid crystal display device G of this embodiment is a light reflective-type liquid crystal display device having a reflector 140. In FIG. 33, elements having the same functions as those of the elements of the liquid crystal display device F shown in FIG. 18 are designated by the same reference numerals given to the elements of the device F. Essentially, the liquid crystal display device G is fabricated by incorporating the reflector 140 in the structure of the device F of Embodiment 18. However, the device G differs from the device F of Embodiment 18 in that the liquid crystal layer 105 contains a chiral agent. Use of a chiral agent permits the smooth transition from the initial state of the liquid crystal molecules to a twisted, bend alignment state and increases response speed. In this case, the director alignment of the liquid crystal is in the bend alignment state having twist that exists at the center of the liquid crystal, but the inventive effect of Embodiment 18 in terms of viewing angles can be achieved by Embodiment 19.

The fabrication method of the liquid crystal display device G having the above features is as follows.

(1) A prepolymerized-type polyimide surface alignment agent AL-5062 produced by Japan Synthetic Rubber Co., Ltd. is applied by spin coating to the two glass substrates 101, 108 having the transparent electrodes 102, 107, and then cured at 180° over one hour within a thermostatic chamber.

(2) Then, the surfaces of the coated, glass substrates 101, 108 are rubbed in the same direction, using a rayon rubbing cloth to produce a twist angle ω of 0°. The glass substrates 101, 108 are bonded so as to have a gap distance of 10 μm therebetween by use of the spacers 104 produced by Sekisui Fine Chemical Co., Ltd. and Structbond 352A that is a sealing resin produced by Mitsui Toatsu Chemicals Co. Ltd., whereby the vacant liquid crystal cell 110 is formed.

(3) 100 parts by weight of a positive nematic liquid crystal LIXON-5052 (NI point=104°, Δn=0.102) produced by Chisso Corporation and having a chiral pitch of 20 μm and 1 part by weight of a black dye S-466 produced by Mitsubishi Chemical Corporation are injected in the vacant liquid crystal cell 110 placed in an evacuated chamber.

(4) The polarizing plate 109 is bonded to the liquid crystal cell 110 such that the rubbing direction of the substrates coincides with the direction of the polarizing axis of the polarizing plate, and the reflector 140 is bonded to the liquid crystal cell 110, thereby fabricating the liquid crystal display device G.

The voltage-brightness characteristic of the liquid crystal display device G thus fabricated was measured by a known method while a rectangular wave voltage of 30 Hz being applied to it. The contrast ratio obtained when the display device G was viewed squarely was 30:1.

When displaying images in 8 tones in the liquid crystal display device G, the response between every two tones was 30 msec or less, and the viewing angle dependence of hues was not observed. To obtain the range of viewing angles with which a contrast ratio of 5:1 or more can be obtained, a measurement was conducted like Embodiment 18. It was found that the display device G has a wide range of viewing angles, providing a viewing angle of 100° in a vertical direction and a viewing angle of 115° in a lateral direction. The usefulness of the display device G was thus confirmed. It should be noted that while the polarizing plate 109 is disposed on the light incoming side of the liquid crystal cell 110 in Embodiments 13 to 19, it may be disposed on the light outgoing side.

EMBODIMENT 20

This embodiment provides a liquid crystal display device incorporating the OCB mode of a similar mode, that is designed to compensate the different transmission characteristics of the three primary colors. Such compensation is accomplished by employing different pretilt angles for the three primary colors, instead of adjusting applied voltage for every primary color.

Concretely, the pretilt angle is so varied as to hold the relationship described by: the pretilt angle for blue<the pretilt angle for green<the pretilt angle for red. That is, the pretilt angle corresponding to blue is the smallest among three. If the pretilt angle is made too small, the energy necessary for the transition from the splay alignment state to the bend alignment state increases, so that the transition becomes difficult to carry out. Therefore, it is necessary to set the pretilt angle for blue in a range that causes the transition with ease. Red has the largest pretilt angle and if the pretilt angle is made too large, it will impair displaying with the appropriate bend director alignment. Therefore, the pretilt angle for red should be no more than around 30°. There must be a preferable range for the pretilt angle for each primary color, blue, green and red, to satisfy the above conditions.

There will be explained on a surface treatment technique for producing the director alignment having different pretilt angles for the three primary colors.

(1) First, a polyamic acid type polyimide alignment film PSI-A2204 produced by Chisso Corporation is applied using a spinner to the entire surfaces of the electrodes formed on the substrates and then, cured.

(2) For forming a pretilt angle for red, application of a negative resist OMR-83 produced by Tokyo Ohka Kogyo Co., Ltd. exposure by use of a photo mask and development are sequentially carried out, such that only the region corresponding to red pixels is exposed. In this condition, a homeotropic agent (produced by Merck KGaA) is diluted, applied to and chemically combined to the surface of the red region. By such application of the homeotropic agent, the pretilt angle of only the region to which the agent has been applied can be made larger than those of other regions, when the cell is filled with a liquid crystal in the later step.

(3) After removing the resist, the surfaces of the electrodes are entirely rubbed by the ordinary method.

(4) For forming a pretilt angle for blue, only the blue pixel-corresponding region is exposed to radiation of an ultraviolet ray of 360 nm, using a photo mask. The radiation of the ultraviolet ray causes decomposition of the alignment film so that when the cell is filled with a liquid crystal later, the pretilt angle of only this region can be made smaller.

When the above surface treatment is carried out, various pretilt angles can be obtained by adjusting the dilution rate of the homeotropic agent, the radiation energy of ultraviolet light and others. In an actual liquid crystal display device formed by the foregoing technique, the pretilt angle of the blue pixel-corresponding region on the upper and lower substrates is about 2° and the pretilt angle of the red pixel-corresponding region on both substrates is about 19°. The pretilt angle of the green-pixel corresponding region on both substrates to which no special treatment has been applied is about 5° to 6° like the case of the prior art liquid crystal display devices.

Figure 34:
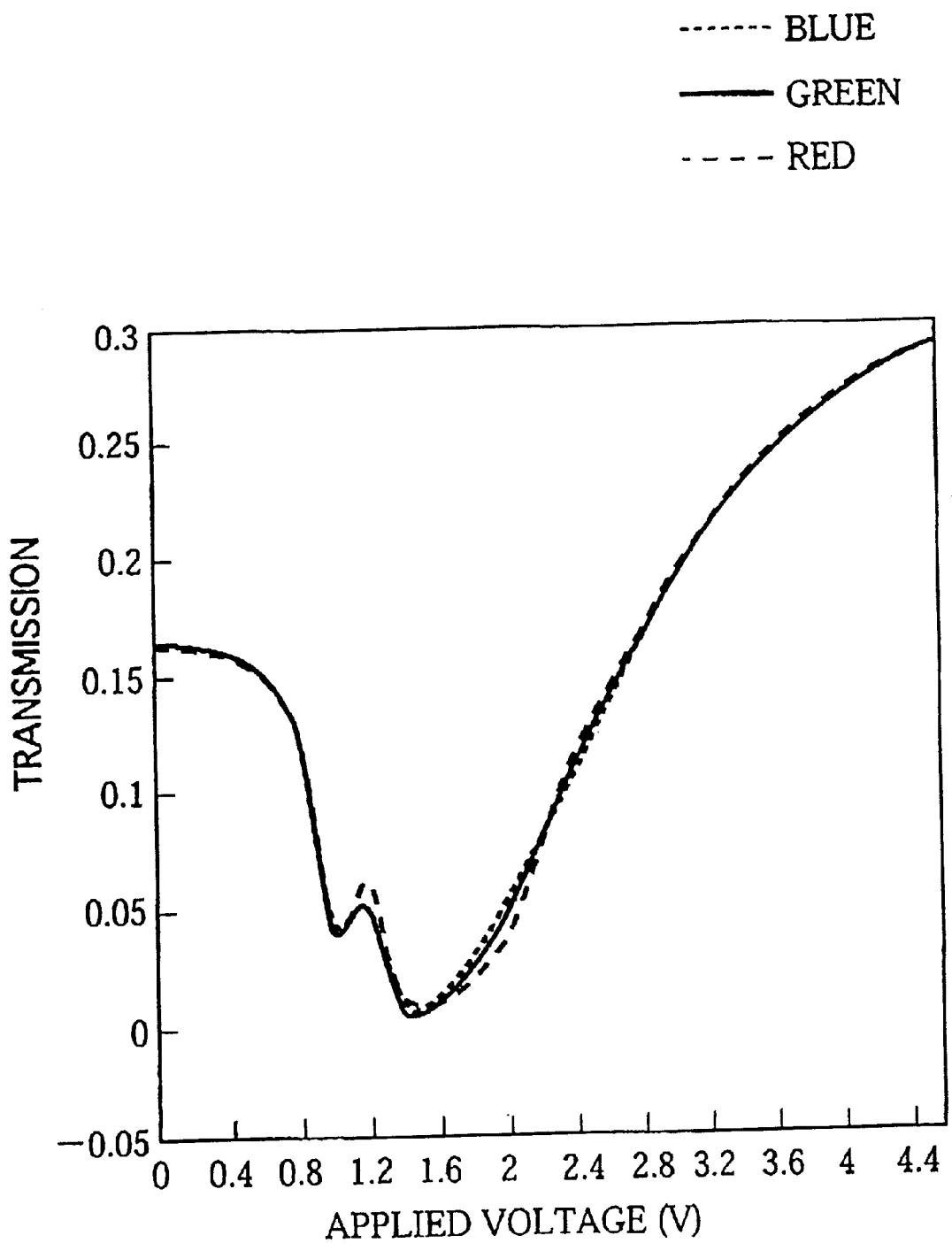
FIG. 34 shows the transmission-applied voltage characteristic of a liquid crystal display device according to a twentieth embodiment of the invention.

FIG. 34 shows the transmission-applied voltage characteristic of the liquid crystal display device of Embodiment 20. As understood from FIG. 34, the virtually same transmission can be obtained for each of the primary colors, blue, green, red, irrespective of applied voltage. With this arrangement, voltage adjustment for the three primary colors is no longer necessary, and image displaying with appropriate hues is enabled without loosing a balance even if the same voltage is applied to the regions of different colors. Although Embodiment 20 does not use a phase compensator, it may be included in Embodiment 20 in which case, the same inventive effect can be obtained.

While Embodiment 19 has been described with a reflective liquid crystal display device, Embodiment 19 is applicable to transmissive liquid crystal display devices having no reflector. Also, other embodiments described earlier are applicable to both reflective and transmissive liquid crystal display devices. In the case of a reflective liquid crystal display device, the substrates may be made of silicon or reflective materials such as metals including aluminum, or alternatively a reflective metal film may be applied to either the pixel electrodes or the counter electrode.

All of the above-described embodiments may be applied to passive matrix-type liquid crystal display devices and also to active matrix-type liquid crystal display devices incorporating an active element such as a TFT (Thin Film Transistor) or MIM (Metal Insulated Metal) formed on either substrate. The active matrix-type enables display images of better quality. The invention is applicable to various types of liquid crystal display devices such as normally-white liquid crystal display devices and normally-black liquid crystal display devices which display white and black images respectively, when no voltage is applied.

It should be noticed that the materials of the elements constituting each device are not limited to those described above. For example, plastic substrates may be used as the transparent substrates and other surface alignment agents than polyimide surface alignment agents may be used. While left-handed cholesteryl nonanoate is used as the chiral agent in the foregoing embodiments, other types of chiral agents including the left-handed and right-handed may be used. As a matter of course, the pretilt angle and the gap distance between the transparent substrates are not limited to the above values, but may be varied according to the material of the liquid crystal and other optical design conditions. Although it is preferable that the pretilt angles of the alignment films on both sides of the liquid crystal cell be equal to each other in view of the symmetry of viewing angles, they may differ from each other in order to facilitate a change in the alignment state of the liquid crystal molecules. Further, in Embodiment 1 and other embodiments, a phase compensator is provided on only one side of the liquid crystal cell but both sides may be respectively provided with a phase compensator.

What is claimed is:

1. A liquid crystal display device comprising (1) a pixel electrode, (2) a counter electrode and (3) a liquid crystal enclosed between the pixel and counter electrodes, wherein the respective opposed surfaces of the pixel and counter electrodes are conditioned such that liquid crystal molecules contacting or in the vicinity of said surfaces have specified pretilt angles, wherein the liquid crystal is in a splay alignment state when no voltage is being applied thereto, a transition wherein the splay alignment state is transformed into a bend alignment state by applying a voltage is carried out prior to image displaying, and the image displaying is performed under the bend alignment state, and wherein a large pretilt angle domain is formed on at least either one of said surfaces of the pixel and counter electrodes, the large pretilt angle domain causing a larger pretilt angle of liquid crystal molecules than a region surrounding the large pretilt angle domain does, whereby the transition from the splay alignment state to the bend alignment state is promoted.

2. A liquid crystal display device according to claim 1, wherein the pretilt angle of the liquid crystal molecules caused by the large pretilt angle domain is 10° or more larger than that caused by the surrounding region.

3. A liquid crystal display device according to claim 1, wherein the pretilt angle of the liquid crystal molecules caused by the large pretilt angle domain is 15° or more.

4. A liquid crystal display device according to claim 3, wherein the pretilt angle of the liquid crystal molecules caused by the large pretilt angle domain is 70° or more.

5. A liquid crystal display device according to claim 1, wherein a plurality of said pixel electrodes are provided and at least one large pretilt angle domain is formed on each pixel electrode.

6. A liquid crystal display device according to claim 1, wherein said large pretilt angle domain is formed by a surface alignment agent which causes a larger pretilt angle of the liquid crystal molecules than the surrounding region does.

7. A liquid crystal display device according to claim 1, wherein said large pretilt angle domain is formed by a projection which causes a larger pretilt angle of the liquid crystal molecules than the surrounding region does.

8. A liquid crystal display device according to claim 1, wherein said liquid crystal contains a chiral agent.

* * * * *